United States Patent
Kondadadi et al.

(10) Patent No.: US 10,853,394 B2
(45) Date of Patent: Dec. 1, 2020

(54) METHOD, APPARATUS AND COMPUTER PROGRAM PRODUCT FOR A HYBRID QUESTION-ANSWERING (QA) SYSTEM WITH A QUESTION CLASSIFICATION MODEL

(71) Applicant: Optum, Inc., Minnetonka, MN (US)

(72) Inventors: Ravi Kondadadi, Minnetonka, MN (US); Stephen G. Graham, Minnetonka, MN (US); Rick A. Hamilton, Charlottesville, VA (US); Dmitry Rekesh, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 87 days.

(21) Appl. No.: 16/178,744

(22) Filed: Nov. 2, 2018

(65) Prior Publication Data

US 2020/0142997 A1     May 7, 2020

(51) Int. Cl.
  *G06F 17/00*   (2019.01)
  *G06F 16/332*  (2019.01)
  *G06F 17/18*   (2006.01)
  *G06N 3/04*    (2006.01)
  *G06N 20/00*   (2019.01)
  *G06F 16/35*   (2019.01)

(52) U.S. Cl.
  CPC .......... *G06F 16/3329* (2019.01); *G06F 16/35* (2019.01); *G06F 17/18* (2013.01); *G06N 3/04* (2013.01); *G06N 20/00* (2019.01)

(58) Field of Classification Search
  CPC ...... G06F 16/3329; G06F 16/35; G06F 17/18; G06F 40/00; G06N 20/00; G06N 3/04
  See application file for complete search history.

(56) References Cited

U.S. PATENT DOCUMENTS

| | | | |
|---|---|---|---|
| 7,519,529 B1 * | 4/2009 | Horvitz | G06F 16/35 704/7 |
| 7,809,664 B2 | 10/2010 | Heck | |
| 9,158,773 B2 | 10/2015 | Clark et al. | |
| 9,230,009 B2 | 1/2016 | Alkov et al. | |
| 9,558,448 B2 | 1/2017 | Allen et al. | |
| 9,767,094 B1 | 9/2017 | Beller et al. | |
| 9,946,747 B2 | 4/2018 | Barker et al. | |
| 10,706,846 B1 | 7/2020 | Barton et al. | |

(Continued)

FOREIGN PATENT DOCUMENTS

WO      20181157804 A1      9/2018

OTHER PUBLICATIONS

Brigitte Grau et al, A Corpus for Hybrid Question Answering Systems, In Companion Proceedings of the the Web Conference 2018 (WWW '18). International World Wide Web Conferences Steering Committee, 1081-1086, Apr. (Year: 2018).*

(Continued)

*Primary Examiner* — Greta L Robinson
(74) *Attorney, Agent, or Firm* — Alston & Bird LLP

(57) ABSTRACT

Methods, apparatus, systems, computing devices, computing entities, and/or the like for a hybrid question-answering (QA) application are provided. The hybrid QA application includes both a retrieval QA application and a deep QA application, as well as a question classification model that determines whether the retrieval QA application or the deep QA application can generate a better answer to an input question.

14 Claims, 14 Drawing Sheets

(56) References Cited

U.S. PATENT DOCUMENTS

| | | | |
|---|---|---|---|
| 2007/0094285 A1* | 4/2007 | Agichtein | G06F 16/243 |
| 2011/0125734 A1 | 5/2011 | Duboue et al. | |
| 2011/0320187 A1* | 12/2011 | Motik | G06F 40/295 |
| | | | 704/9 |
| 2014/0172880 A1* | 6/2014 | Clark | G06N 5/022 |
| | | | 707/748 |
| 2014/0172883 A1* | 6/2014 | Clark | G06F 16/334 |
| | | | 707/749 |
| 2015/0340032 A1 | 11/2015 | Gruenstein | |
| 2016/0253596 A1* | 9/2016 | Goth, III | G06F 16/24578 |
| | | | 706/12 |
| 2017/0039293 A1 | 2/2017 | Kummamuru et al. | |
| 2017/0161363 A1 | 6/2017 | Cortis et al. | |
| 2018/0020094 A1 | 1/2018 | Marrelli et al. | |
| 2018/0181573 A1* | 6/2018 | Zhao | G06F 16/24578 |
| 2020/0050942 A1 | 2/2020 | Sun et al. | |

OTHER PUBLICATIONS

Jurafsky et al. "Question Answering," Speech and Language Processing, Chapter 28, Draft of Aug. 7, 2017, (19 pages).

Lee et al. "Training IBM Watson Using Automatically Generated Question-Answer Pairs," Nov. 12, 2016, (9 pages). [Retrieved from the Internet Aug. 22, 2019] <https://arxiv.org/abs/1611.03932>.

Levy, Nat. "Microsoft and Alibaba AI Programs Beat Humans in Stanford Reading Comprehension Test for 1st Time," Jan. 15, 2018, (8 pages). [Retrieved from the Internet Aug. 22, 2019] <https://www.geekwire.com/2018/microsoft-alibaba-ai-programs-beat-humans-stanford-reading-test-1st-time/>.

Natural Language Computing Group. "R-Net: Machine Reading Comprehension With Self-Matching Networks," Microsoft Research Asia, May 8, 2017, pp. 1-11. [Retrieved from the Internet Aug. 22, 2019] <https://web.archive.org/web/20180105035052/https://www.microsoft.com/en-us/research/publication/mrc/>.

Xiong, Caiming et al. "Dynamic Coattention Networks for Question Answering," Published As a Conference Paper At ICLR 2017, pp. 1-14, Salesforce Research, Palo Alto, California. [Retrieved from the Internet Aug. 22, 2018] <https://arxiv.org/abs/1611.01604>.

Asakiewicz, Christopher et al. "Building a Cognitive Application Using Watson DeepQA," in It Professional, vol. 19, No. 4, pp. 36-44, (2017). DOI: 10.1109/MITP.2017.3051322.

Ferrucci, D. A. "Introduction to 'This is Watson'," in IBM Journal of Research and Development, vol. 56, No. 3.4, pp. 1:1-1:15, May-Jun. 2012. DOI: 10.1147/JRD.2012.2184356.

United States Patent and Trademark Office, NonFinal Rejection for U.S. Appl. No. 16/178,719, Sep. 24, 2020, (20 pages), USA.

* cited by examiner

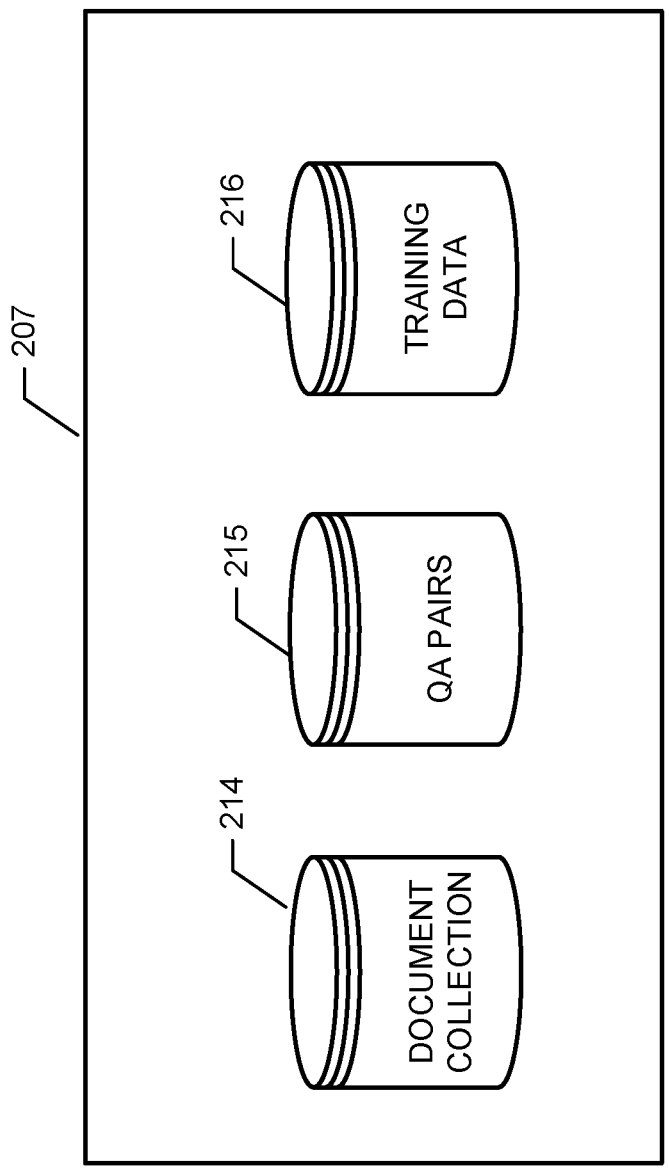

METHOD, APPARATUS AND COMPUTER PROGRAM PRODUCT FOR A HYBRID QUESTION-ANSWERING (QA) SYSTEM WITH A QUESTION CLASSIFICATION MODEL

TECHNOLOGICAL FIELD

Embodiments of the present invention generally relate to machine-learning based methodologies for automatic question-answering (QA). More specifically, various embodiments of the present invention include both a retrieval based QA (retrieval QA) application and a deep learning based QA (deep QA) application, as well as a question classification model (QCM) that determines whether the retrieval QA application or the deep QA application is capable of providing a better answer to an input question.

BACKGROUND

As recognized, a common technical challenge in computer-implemented automatic question-answering (QA) is generating accurate answers to complex questions posed in natural language form. The causes of this technical challenge can stem from a variety of reasons. For example, some QA systems/platforms/applications rely on formulating a search query based on the question. However, such methodologies have a variety of shortcomings. For example, when the question is very complex, these QA systems/platforms/applications are unable to properly formulate a search query. Some QA systems/platforms/applications rely on machine learning, yet these QA systems/platforms/applications often lack proper training.

These technical challenges also have business implications. For example, there is a need for QA automation in consumer support. For instance, when a QA system fails to return a relevant answer to a question asked by a consumer, the consumer may request to talk to a human agent over the phone, thus increasing the operating cost of the company.

Accordingly, there is a latent need for a rigorous methodology for a QA system that generates accurate answers to complex questions posed in natural language form. Through applied effort, ingenuity, and innovation, the inventors have developed systems and methods that produce such QA systems/platforms/applications. Some examples of these solutions are described in detail herein.

BRIEF SUMMARY

In general, embodiments of the present invention provide methods, apparatus, systems, computing devices, computing entities, and/or the like.

In accordance with one aspect, a computer-implemented method for implementing a question classification model for a hybrid question answering (QA) application is provided. The hybrid QA application comprises a deep QA application and a retrieval QA application. In one embodiment, the method comprises receiving an input question originating from a user computing entity; determining a first confidence score associated with the retrieval QA application using the question classification model, the first confidence score indicating a success likelihood of the retrieval QA application answering the input question and the question classification model comprising one or more machine learning models; and determining whether to use the retrieval QA application or the deep QA application to generate an answer to the input question based at least in part on the first confidence score.

In accordance with another aspect, a computer program product for implementing a question classification model for a hybrid question answering (QA) application is provided. The hybrid QA application comprises a deep QA application and a retrieval QA application. The computer program product may comprise at least one computer-readable storage medium having computer-readable program code portions stored therein, the computer-readable program code portions comprising executable portions configured to receive an input question originating from a user computing entity; determine a first confidence score associated with the retrieval QA application using the question classification model, the first confidence score indicating a success likelihood of the retrieval QA application answering the input question and the question classification model comprising one or more machine learning models; and determine whether to use the retrieval QA application or the deep QA application to generate an answer to the input question based at least in part on the first confidence score.

In accordance with yet another aspect, a computing system for implementing a question classification model for a hybrid question answering (QA) application is provided. The hybrid QA application comprises a deep QA application and a retrieval QA application. The computing system comprises at least one processor and at least one memory including computer program code. In one embodiment, the at least one memory and the computer program code may be configured to, with the processor, cause the apparatus to receive an input question originating from a user computing entity; determine a first confidence score associated with the retrieval QA application using the question classification model, the first confidence score indicating a success likelihood of the retrieval QA application answering the input question and the question classification model comprising one or more machine learning models; and determine whether to use the retrieval QA application or the deep QA application to generate an answer to the input question based at least in part on the first confidence score.

The above summary is provided merely for purposes of summarizing some example embodiments to provide a basic understanding of some aspects of the invention. Accordingly, it will be appreciated that the above-described embodiments are merely examples. It will be appreciated that the scope of the invention encompasses many potential embodiments in addition to those here summarized, some of which will be further described below.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 2C is a schematic representation of a storage media storing a plurality of repositories, databases, and/or relational tables in accordance with various embodiments of the present invention;

DETAILED DESCRIPTION OF SOME EXAMPLE EMBODIMENTS

Figure 1:
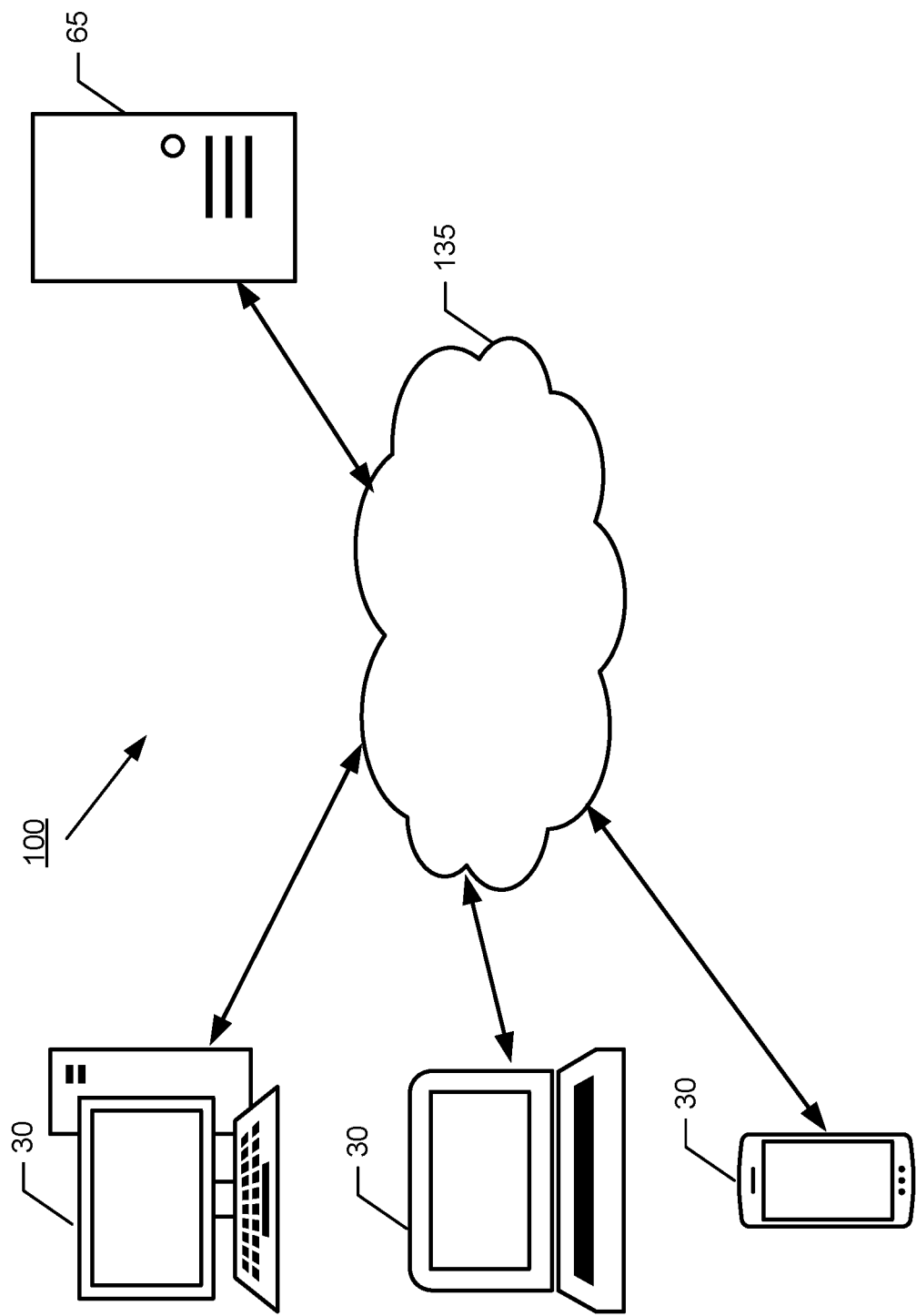
FIG. 1 is a diagram of a hybrid question-answering (hybrid QA) platform/system that can be used in accordance with various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

The phrases "in one embodiment," "according to one embodiment," and/or the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

I. COMPUTER PROGRAM PRODUCTS, METHODS, AND COMPUTING ENTITIES

Embodiments of the present invention may be implemented as computer program products that comprise articles of manufacture. Such computer program products may include one or more software components including, for example, applications, software objects, methods, data structures, and/or the like. A software component may be coded in any of a variety of programming languages. An illustrative programming language may be a lower-level programming language such as an assembly language associated with a particular hardware architecture and/or operating system platform/system. A software component comprising assembly language instructions may require conversion into executable machine code by an assembler prior to execution by the hardware architecture and/or platform/system. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Embodiments of the present invention may also be implemented as a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media may include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAIVI), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a hybrid question-answering (hybrid QA) platform/system 100 that can be used in conjunction with various embodiments of the present invention. As shown in FIG. 1, the hybrid QA platform/system 100 may comprise one or more QA computing entities 65, one or more user computing entities 30, and one or more networks 135. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrate certain system entities as separate, standalone entities, the various embodiments are not limited to this particular architecture.

a. Exemplary QA Computing Entity

Figure 2A:
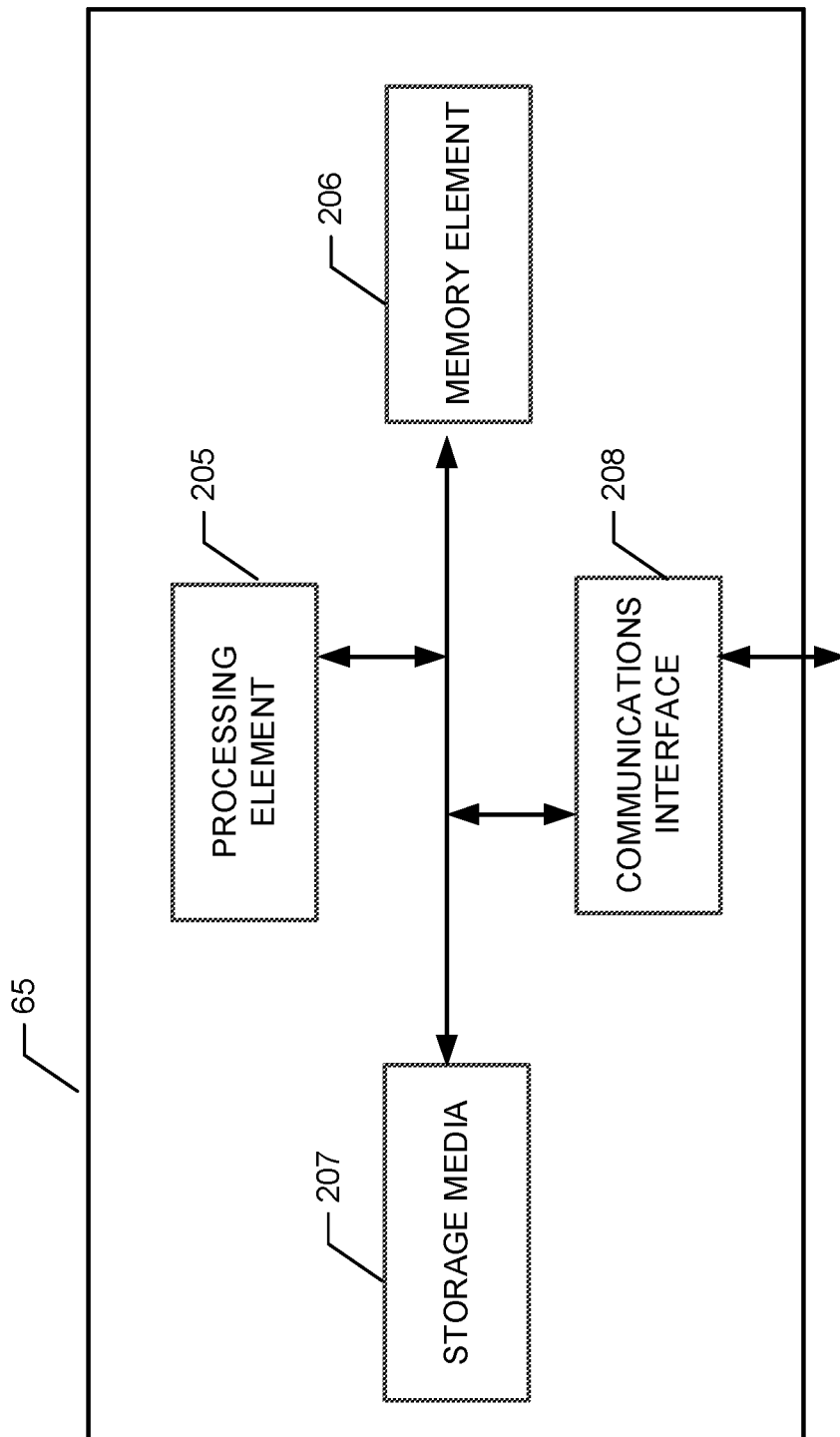
FIG. 2A is a schematic representation of a QA computing entity in accordance with various embodiments of the present invention.

FIG. 2A provides a schematic of a QA computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein. In one embodiment, these functions, operations, and/or processes can be performed on data, content, information, and/or similar terms used herein.

As indicated, in one embodiment, the QA computing entity 65 may also include one or more network and/or communications interfaces 208 for communicating with various computing entities, such as by communicating data, content, information, and/or similar terms used herein that can be transmitted, received, operated on, processed, displayed, stored, and/or the like. For instance, the QA computing entity 65 may communicate with other QA computing entities 65, one or more user computing entities 30, and/or the like.

As shown in FIG. 2A, in one embodiment, the QA computing entity 65 may include or be in communication with one or more processing elements 205 (also referred to as processors, processing circuitry, and/or similar terms used herein interchangeably) that communicate with other elements within the QA computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the QA computing entity 65 may further include or be in communication with volatile media (also referred to as volatile storage, memory, memory storage, memory circuitry and/or similar terms used herein interchangeably). In one embodiment, the volatile storage or memory may also include one or more memory element 206 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory element 206 may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the QA computing entity 65 with the assistance of the processing element 205 and operating system.

Figure 2B:
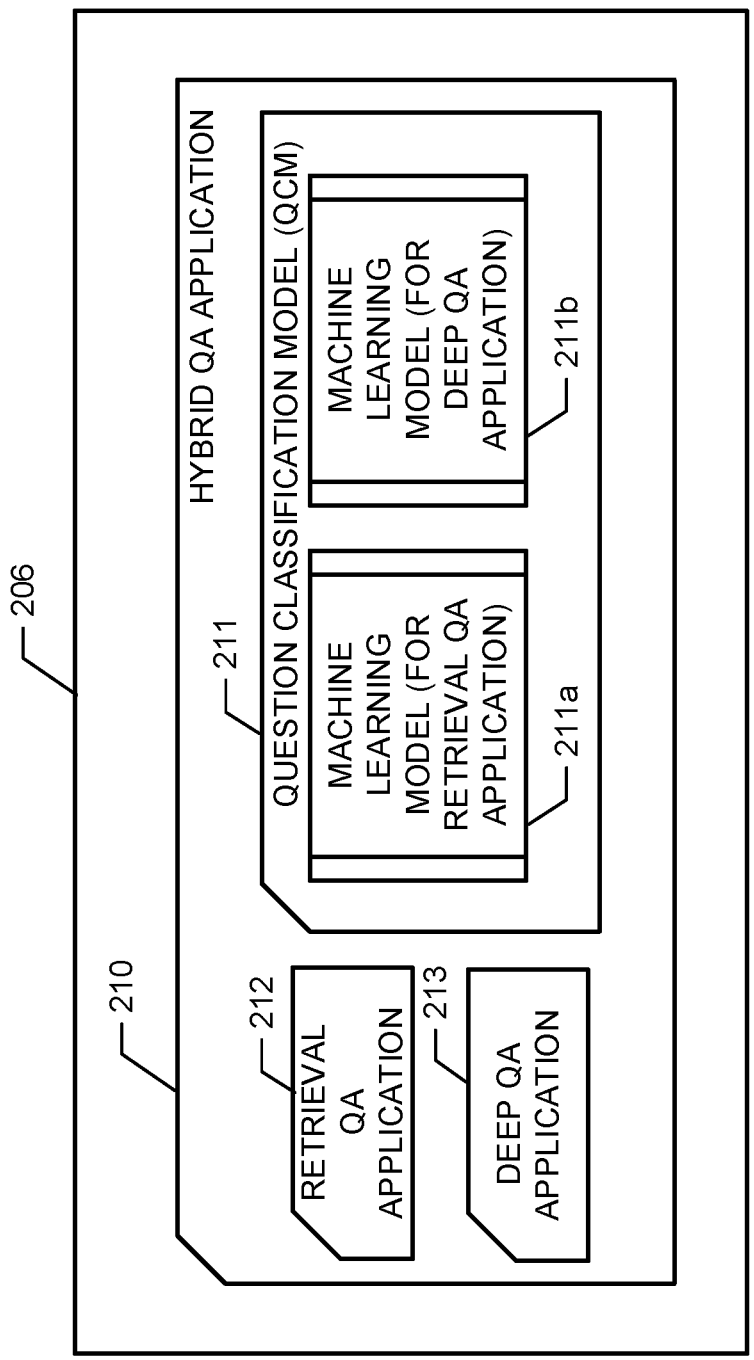
FIG. 2B is a schematic representation of a memory element storing a plurality of applications, programs, scripts, and/or source code in accordance with various embodiments of the present invention.

As illustrated in FIG. 2B, the data stored in the memory element 206 may comprise computer programming applications such as the hybrid QA application 210, which comprises the question classification model (QCM) 211, retrieval QA application 212 and the deep QA application 213 (e.g., deep QA model 213). Details of the retrieval QA application 212 are described further in connection with FIG. 4 below. Details of the deep QA application 213 are described further in connection with FIGS. 5-6 below. Details of the hybrid QA application 210 and the QCM 211 are described further in connection with FIGS. 7-12.

As illustrated in FIG. 2B, the QCM 211 may include one or more machine learning models, such as text categorization models. For example, the QCM 211 may include one or more binary classification models that determine whether the retrieval QA application 212 or the deep QA application 213 provides a better answer to a given input question.

In some embodiments, the QCM 211 includes one machine learning model (e.g., one binary classification model). For example, the QCM 211 may include a machine learning model 211a for the retrieval QA application 212 that determines whether the retrieval QA application 212 is suitable for an input question by generating a prediction (such as a confidence score) for the retrieval QA application 212. In some alternative embodiments, the QCM 211 may include a machine learning model (for deep QA application 213) 211b that determines whether the deep QA application 213 is suitable for an input question by generating a prediction (such as a confidence score) for the deep QA application 213. The output of the QCM 211 in these examples is one or more predictions (or confidence scores) that a particular QA application is suited for a particular question.

In some embodiments, the QCM 211 includes both a machine learning model 211a for the retrieval QA application and a machine learning model 211b for the deep QA application, as shown in FIG. 2B.

In one embodiment, the QA computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or storage media 207 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or storage media 207 may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Storage media 207 may also be embodied as a data storage device or devices, as a separate database server or servers, or as a combination of data storage devices and separate database servers. Further, in some embodiments, storage media 207 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the recovery prediction system may be stored. Further, the information/data required for the operation of the recovery prediction system may also be partially stored in the cloud data storage system and partially stored in a locally maintained data storage system.

More specifically, storage media 207 may encompass one or more data stores configured to store information/data usable in certain embodiments. For example, as shown in FIG. 2C, data stores encompassed within the storage media 207 may comprise document collection 214, question-answer (QA) pairs 215, and training data 216.

Continuing with FIG. 2C, document collection 214 comprises data/information supporting the retrieval QA application 212 to generate an answer responsive to a question. For example, if the hybrid QA platform/system 100 is implemented by a healthcare organization, the document collection 214 may include provider information/data indicative of various healthcare providers, such as provider identifiers, provider locations, and/or the like. The document collection 214 may also include member information/data indicative of the identity of members, such as their name, date of birth, date of death, and other identifying information/data. The document collection 214 may also include resource information/data indicative of company resources, such as definitions of terms, benefit plans, and/or the like. The document collection 214 may also include procedure information/data indicative of company procedures. For example, procedure information/data may include information regarding how a member can check his health savings account balance, how to submit a medical claim, and/or the like. Details of how the retrieval QA application 212 generates an answer responsive to a question based on the data/information stored in the document collection 214 are described further below with reference to FIG. 4.

Continuing with FIG. 2C, the question-answer (QA) pairs 215 may comprise data for training the deep QA application 213 (e.g., deep QA model 213) (e.g., deep machine learning QA application or a neural network QA application). For example, each QA pair in the question-answer (QA) pairs 215 includes a question ("Q") and a corresponding correct answer ("A"). As described in further detail, the hybrid QA application 210 adjusts or "trains" the deep QA application 213 (e.g. deep QA model 213) using the QA pairs 215 to improve the accuracy of answers generated by the deep QA application 213 (e.g., deep QA model 213).

Figure 10:
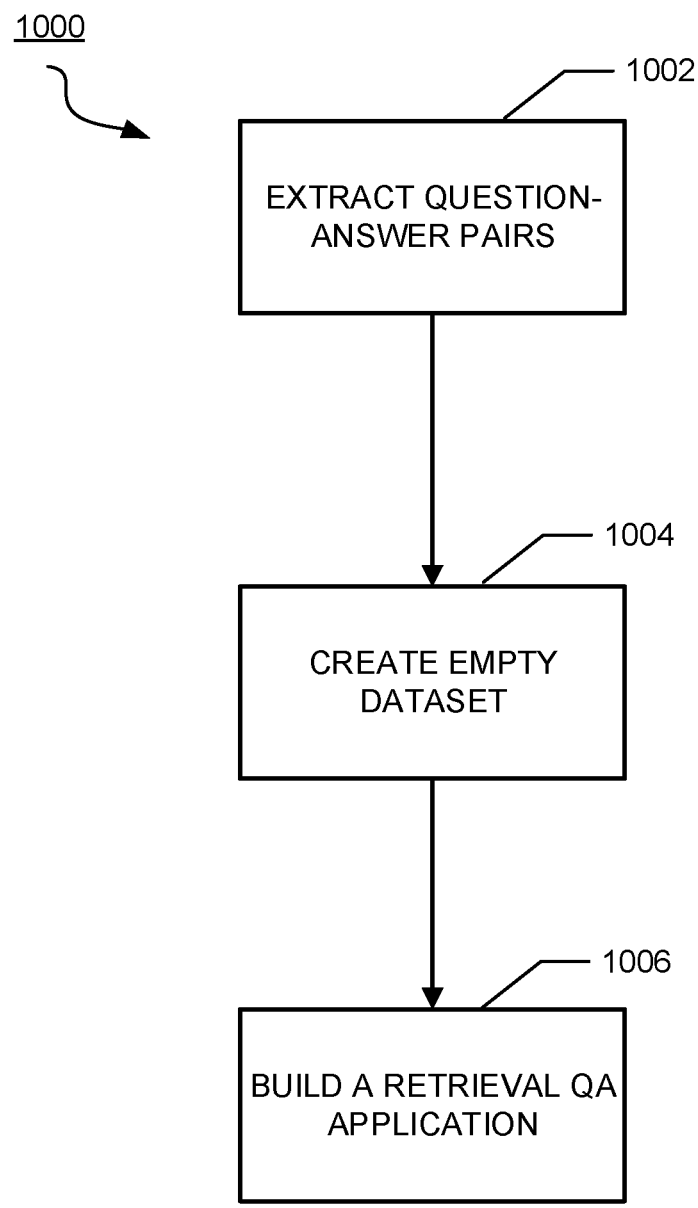
Figure 11:
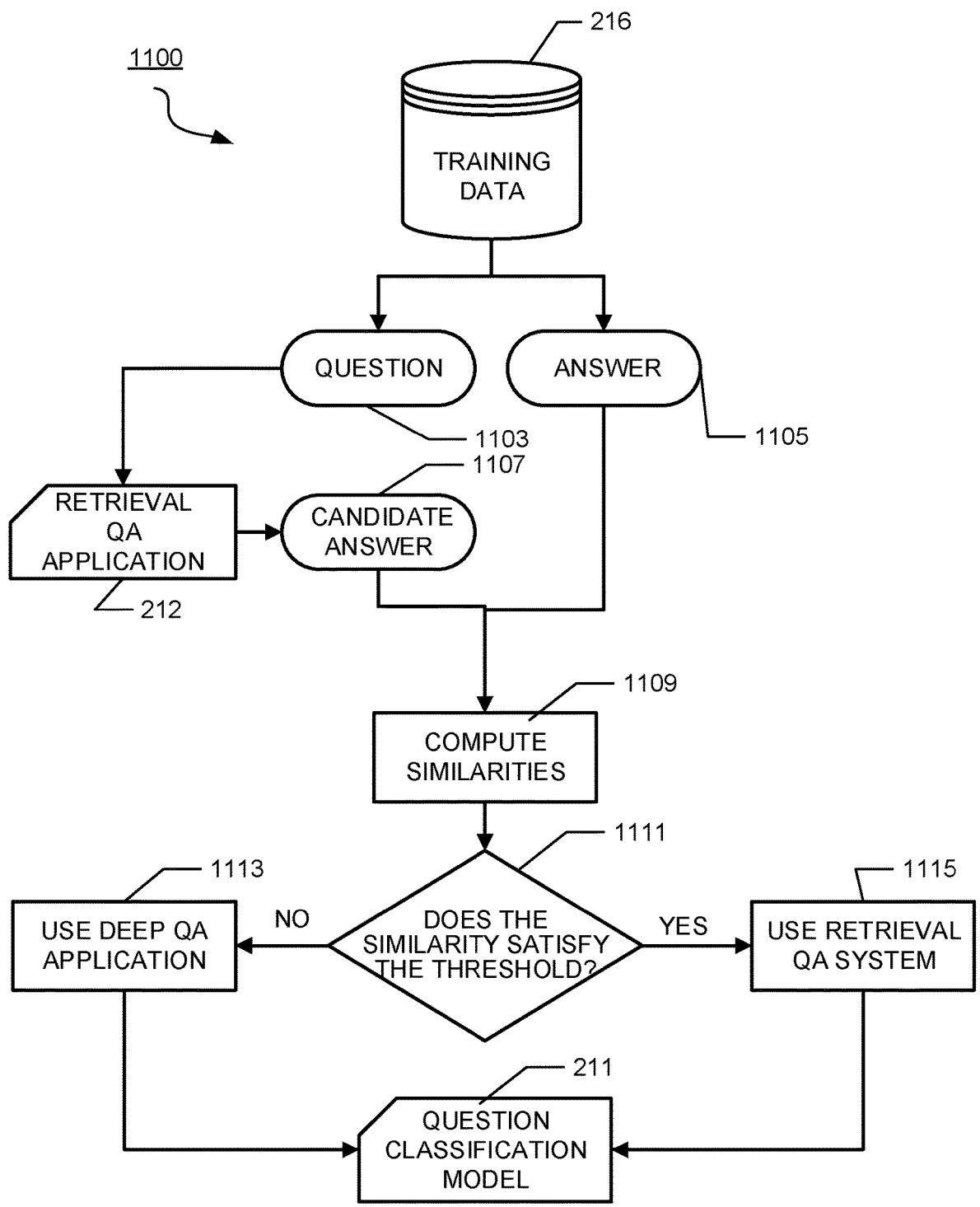
Figure 12:
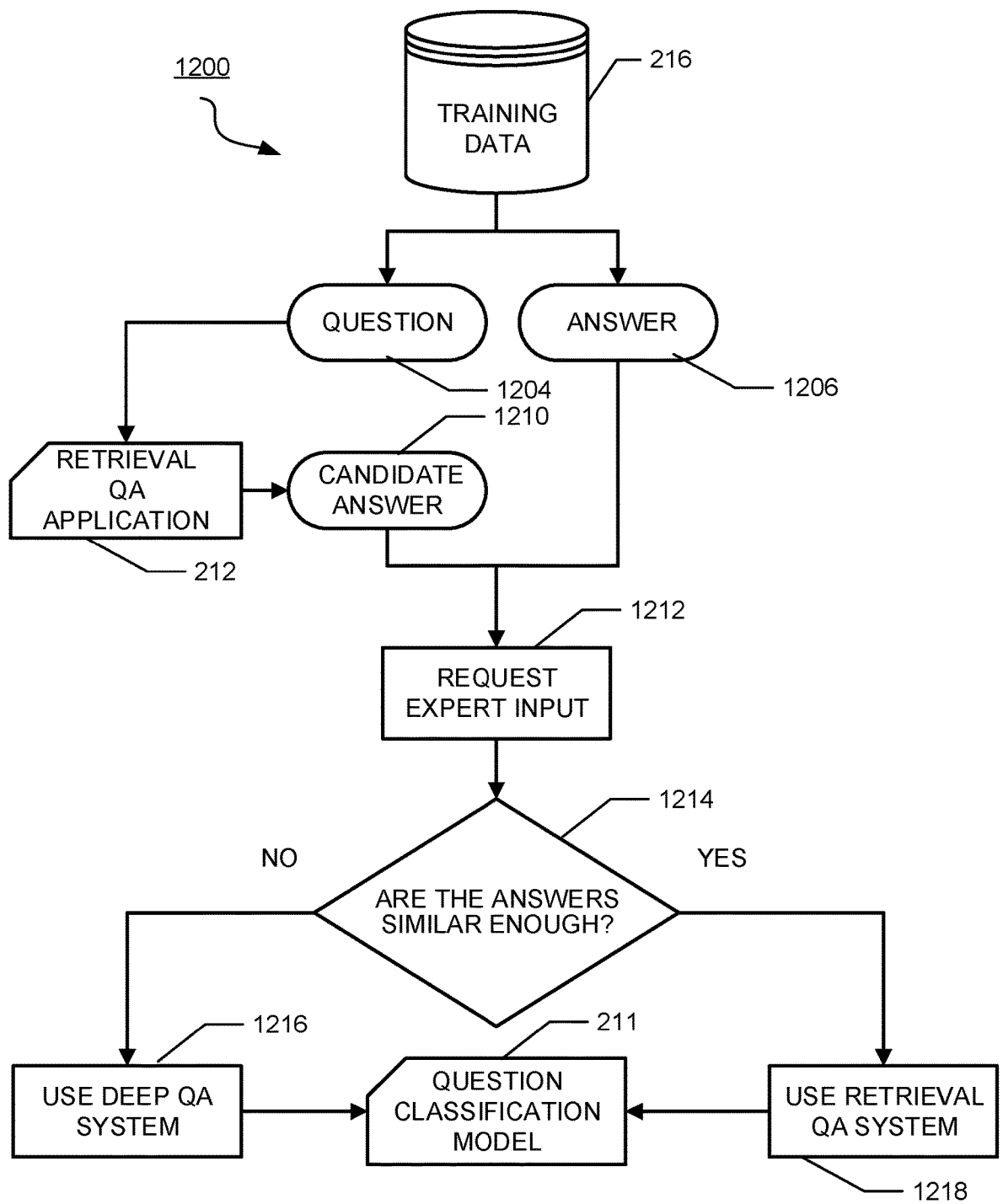

Continuing with FIG. 2C, training data 216 may include information/data for training the question classification model 211, details of which are described further in connection with FIGS. 10, 11, and 12.

As described above, in one embodiment, the question classification model 211, the retrieval QA application 212, and the deep QA application 213 (e.g., deep QA model 213) are stored in the memory elements 206. In an alternative embodiment, the hybrid QA application 210 (including the question classification model 211, the retrieval QA application 212 and the deep QA application 213 (e.g., deep QA model 213)) is stored in the storage media 207. In this embodiment, when the processing element 205 executes code of the hybrid QA application 210 to perform operations in accordance with the present invention, the hybrid QA application 210 is loaded by the processing element 205 to the memory element 206.

As described above, in one embodiment, the document collection 214, the QA pairs 215, and the training data 16 are stored in the storage media 207. In an alternative embodiment, they may be wholly or partially stored in the memory element 206. For example, when the retrieval QA application 212 retrieves documents from the document collection 214 (which will be described further in FIG. 4), the document collection 214 may be partially stored in the memory element 206 (e.g. cache) to facilitate the operations in accordance with the present invention.

As indicated, in one embodiment, the QA computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the QA computing entity 65 may communicate with computing entities or communication interfaces of other QA computing entities 65, user computing entities 30, and/or the like.

As indicated, in one embodiment, the QA computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the QA computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The QA computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the QA computing entity's components may be located remotely from other QA computing entity 65 components, such as in a distributed system. Furthermore, one or more of the components may be aggregated and additional components performing functions described herein may be included in the QA computing entity 65. Thus, the QA computing entity 65 can be adapted to accommodate a variety of needs and circumstances.

b. Exemplary User Computing Entity

Figure 3:
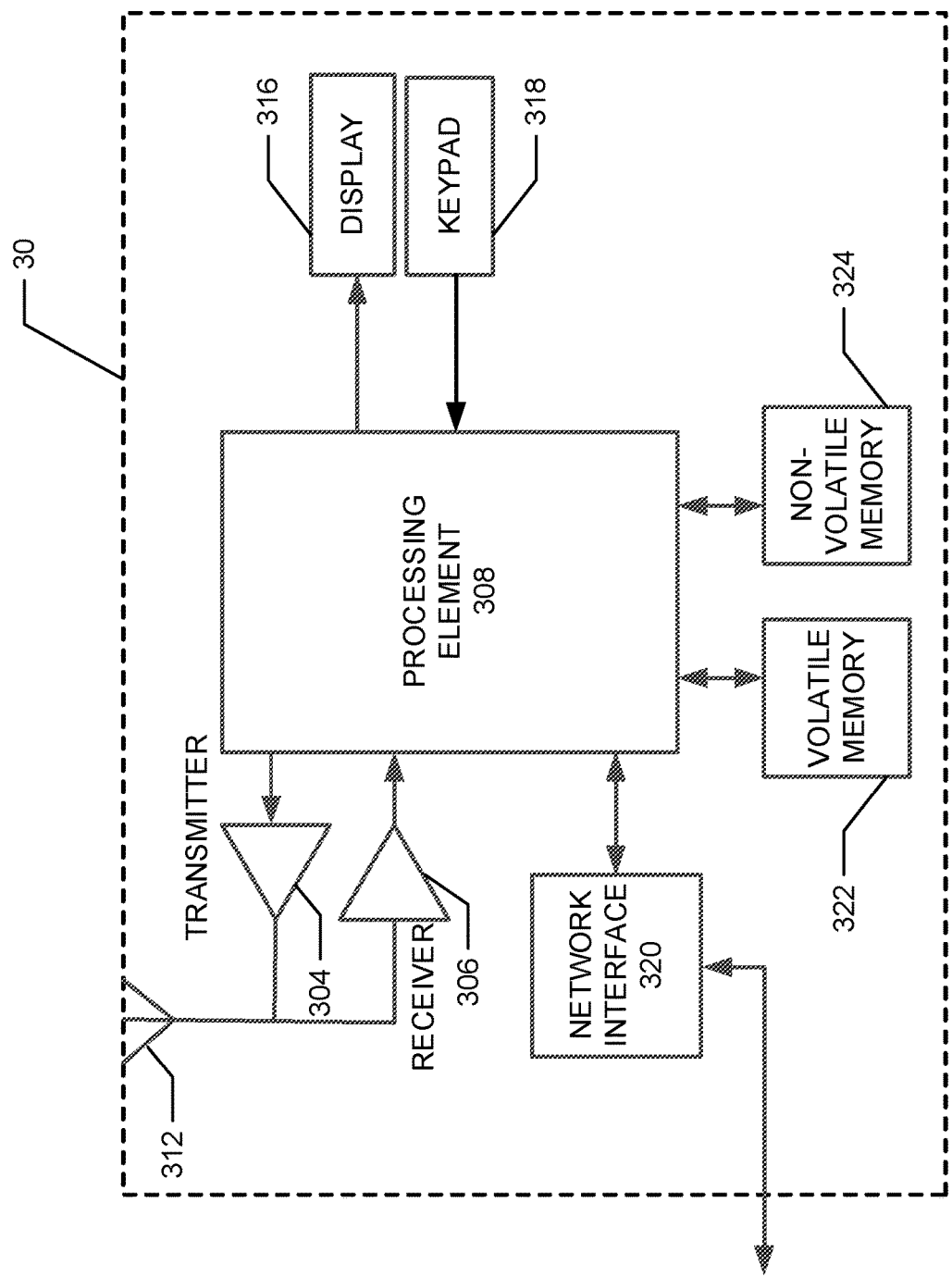
FIG. 3 is a schematic representation of a user computing entity in accordance with various embodiments of the present invention.

FIG. 3 provides an illustrative schematic representative of one of the user computing entities 30 that can be used in conjunction with embodiments of the present invention. As will be recognized, the user computing entity may be operated by an agent and include components and features similar to those described in conjunction with the QA computing entity 65. Further, as shown in FIG. 3, the user computing entity may include additional components and features. For example, the user computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a QA computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using Unstructured Supplementary Service data (USSD), Short Message Service (SMS), Multimedia Messaging Service (MMS), Dual-Tone Multi-Frequency Signaling (DTMF), Subscriber Identity Module Dialer (SIM dialer), and/or the like. The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the QA computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms/systems provided by network providers or other entities.

Further, the networks 135 may utilize a variety of networking protocols including, but not limited to, TCP/IP based networking protocols. In some embodiments, the protocol is a custom protocol of JSON objects sent via a Websocket channel. In some embodiments, the protocol is JSON over RPC, JSON over REST/HTTP, and/or the like.

III. EXEMPLARY SYSTEM OPERATION

Reference will now be made to FIGS. 4-9, which provide flowcharts and diagrams of operations and/or processes for carrying out embodiments of the present invention.

a. Brief Overview

As indicated, there is a latent need for a rigorous methodology for a hybrid QA application that generates accurate answers to complex questions posed in natural language form.

1. TECHNICAL PROBLEM

Automatic question-answering (QA) is a subfield of natural language processing. One of the goals of QA is to automatically generate answers for questions posed in natural language form. As such, QA is a very important component of any conversational artificial intelligence (AI) system.

However, QA systems/platforms/applications are faced with many technical problems and challenges. For example, a retrieval-based QA system may reformulate a question as a query, and then retrieve an ordered collection of document/ passages (e.g. search results) from an information retrieval system based on the query. Each search result is then parsed to find relevant answers for the question. As such, technical disadvantages of a retrieval-based QA system include its heavy reliance on the question being properly formulated and formatted and its dependencies on the search engine to retrieve relevant results.

As another example, a deep QA system is an end-to-end machine learning model for question answering based on deep learning models (e.g. neural networks). Deep QA systems/platforms/applications generate answers from sets of documents responsive to input questions. One of the technical disadvantages of deep QA systems/platforms/applications is that they are "data hungry" and require large volumes of data for training the deep learning models, which can be difficult to extract.

2. TECHNICAL SOLUTION

To overcome at least the above-identified technical challenges, various embodiments of the present invention include a hybrid QA application 210 capable of generating accurate answers to simple and complex questions posed in natural language form. In particular, the hybrid QA application 210 comprises a retrieval QA application 212 and a deep QA application 213. Further, the hybrid QA application 210 comprises a question classification model (QCM) 211 that parses each input question, and determines whether the retrieval QA application 212 or the deep QA application 213 can provide a better answer to the question. In other words, the QCM 211 enables the hybrid QA application 210 to generate better answers (than using either QA application separately) by choosing the most relevant QA application for each question based on how well the question can be answered by each QA application. As a result, the hybrid QA application 210 in accordance with various embodiments of the present invention provides better answers than existing QA systems/platforms/applications. Details of the technical solutions in accordance with embodiments of the present invention are described further below.

b. Retrieval Question Answering (QA) Applications

In various embodiments of the present invention, the hybrid QA application 210 may comprise one or more retrieval QA applications 212. For example, as shown in FIG. 2B, the memory element 206 of a QA computing entity 65 of the hybrid QA platform/system 100 may comprises a retrieval QA application 212. The retrieval QA application 212 generates an answer responsive to a question based on retrieving information from one or more document collection(s), such as document collection 214 stored in the storage media 207 of the QA computing entity 65. Example operations of a retrieval QA application 212 are shown in FIG. 4.

Figure 4:
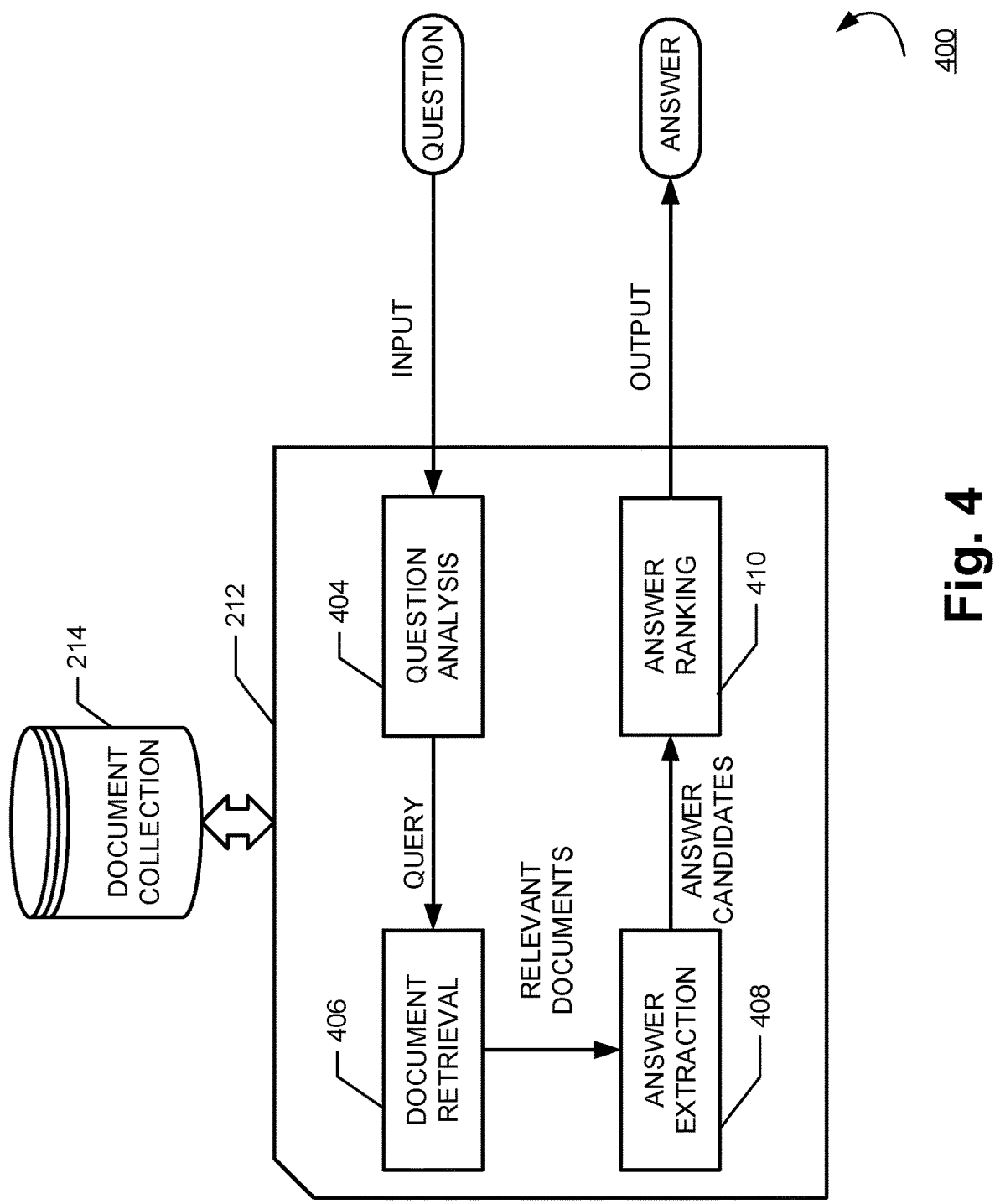
FIG. 4 is a flowchart illustrating an example method of a retrieval question-answering (QA) application generating an answer responsive to an input question, in accordance with various embodiments of the present invention.

Referring now to FIG. 4, an example method 400 illustrates operation of a retrieval QA application 212 in accordance with embodiments of the present invention. At step/ operation 402, the QA computing entity 65 includes means, such as the communications interface 208, for receiving a question as an input to the retrieval QA application 212. For example, a user may input (e.g., voice, text, and/or the like) a question through one of the user computing entities 30, and the QA computing entity 65 may receive the question via the networks 135.

In various embodiments, the question may be posed in natural language form. "Natural language" refers to a language that has developed naturally in use by humans, in contrast to computer code. In other words, the question posed in natural language form is a conversional input by a human. As an example, the following question may be the input to the retrieval QA application 212:

What is the pharmacy deductible?

Referring back to FIG. 4, the QA computing entity 65 includes means, such as the processing element 205 and the memory element 206, for conducting question analysis at step/operation 404. For example, the retrieval QA application 212 may comprise computer program instructions that, when executed by one or more processing elements 205, cause the QA computing entity 65 to analyze the input question to formulate a query. The term "query" (or "document retrieval query," "search query") refers to a data/ information retrieval request to a search engine or information retrieval system, such as the document collection 214 stored in the storage media 207.

For example, the retrieval QA application 212 may comprise computer program instructions that, when executed by one or more processing elements 205, cause the QA computing entity 65 to "tokenize" the input question. Tokenizing of the question demarcates and classifies sections of the question. In other words, tokenization breaks down the question into smaller pieces of information called tokens. Each token is an instance of a sequence of characters that are grouped together as a useful semantic unit for processing. Continuing from the example above, the QA computing entity 65 may tokenize the input question may be tokenized as follows:

What; is; the; pharmacy; deductible;?

In the above example, each token is separated by a semicolon.

After the question is tokenized, the retrieval QA application 212 may comprise computer program instructions that, when executed by one or more processing elements 205, cause the QA computing entity 65 to remove "stop words" from the tokens. "Stop words" are common words in a language that provide little value in formulating a search query. In one embodiment of the present invention, the QA computing entity 65 may include a "stop list" stored in a data storage media, such as the memory element 206 or the storage media 207. The stop list includes all words that the QA computing entity 65 determines to be a "stop word," such as "the," "is," and/or the like. To remove "stop words" from the tokens, the retrieval QA application 212 may comprise computer program instructions that, when executed by one or more processing elements 205, cause the QA computing entity 65 to determine whether a token matches any words from the "stop list." If so, then the QA computing entity 65 removes the token. Continuing from the previous example, the QA computing entity 65 may removes the tokens "what," "is," and "the," resulting in the remaining tokens as follows:

pharmacy; deductible;

After the "stop words" are removed from the tokens, the retrieval QA application 212 may comprise computer program instructions that, when executed by one or more processing elements 205, cause the QA computing entity 65 to formulate a search query. In some embodiments, the QA computing entity 65 may stem the tokens. The goal of stemming is to adjust any token in a derivational form to a common base form. For example, the QA computing entity 65 may change "medications" to "medication." Subsequent to stemming the tokens, the retrieval QA application 212 may formulate a search query. Continuing from the above example, the QA computing entity 65 may generate a search query "pharmacy deductible" based on the input question "What is the pharmacy deductible?".

Referring back to FIG. 4, after the question analysis is conducted and the query is formulated, the QA computing entity 65 includes means, such as one or more processing elements 205, the memory element 206, and the storage media 207, for conducting document retrieval at step/operation 406. For example, the retrieval QA application 212 may comprise computer program instructions that, when executed by one or more processing elements 205, cause the QA computing entity 65 to search the document collection 214 stored in the storage media 207 based on the query generated at step/operation 404. In some embodiments, the QA computing entity 65 may conduct the search using ElasticSearch, which is an open source search engine by APACHE®. After the searching the document collection 214, the QA computing entity 65 identifies one or more relevant document(s) associated with the query.

In some embodiments, the QA computing entity 65 may build the document collection 214 based on existing data and documents in the hybrid QA platform/system 100. For example, if the hybrid QA platform/system 100 is implemented in a healthcare organization, the document collection 214 may include information such as benefit documents, frequently-asked-questions (FAQ) documents, chat logs between agents of the healthcare organization and customer, and/or the like. The document collection 214 provides a knowledge base for the retrieval QA application 212 to retrieve information responsive to the input question.

Referring back to FIG. 4, after relevant document(s) are identified, the QA computing entity 65 includes means, such as one or more processing elements 205, the memory element 206, and the storage media 207, for conducting answer extraction at step/operation 408. For example, the retrieval QA application 212 may comprise computer program instructions that, when executed by one or more processing elements 205, cause the QA computing entity 65 to process relevant document(s) identified at step/operation 406 and generate an answer based on the relevant document(s).

For example, the QA computing entity 65 may rank the relevant documents based on its relevance to the search query, and identify one or more portions from the top ranked documents to create an answer. Continuing from the above example, the QA computing entity 65 may rank a document entitled "Pharmacy Benefits" as the top-ranked relevant document for the search query "pharmacy deductible." The QA computing entity 65 may then create an answer based on the "Helpful Terms to Know" section in the "Pharmacy Benefits" document.

Referring back to FIG. 4, after one or more answers are extracted, the QA computing entity 65 includes means, such as one or more processing elements 205, the memory element 206, and the storage media 207, for conducting answer ranking at step/operation 410. For example, the retrieval QA application 212 may comprise computer program instructions that, when executed by one or more processing elements 205, cause the QA computing entity 65 to rank the answers.

For example, the QA computing entity 65 may calculate a relevance score indicating how relevant each answer is to the question. The QA computing entity 65 may also determine whether the type of the answer (for example, a "yes") matches the type of the question (for example, a yes/no question). The QA computing entity 65 may rank the one or more answers exacted at step/operation 410 based on the above-mentioned calculations, determinations, and/or the like.

In some embodiments of the present invention, the QA computing entity 65 may calculate a relevance score using word overlap, frequency, and/or other techniques. For example, the retrieval QA application 212 may determine the relevance of an answer to a question based on whether there is any overlap between words in the answer and in the question. The retrieval QA application 212 may further determine the relevance based on the frequency of certain keywords in the generated answer and their relevancy to the question.

In some embodiments of the present invention, the QA computing entity 65 may calculate a relevance score using one or more machine learning models. For example, the retrieval QA application 212 may implement one or more machine learning models, which may be used to determine a score indicating how relevant the generated answer is to the question.

Referring back to FIG. 4, after answers are extracted, the QA computing entity 65 includes means, such as one or more processing elements 205 and the communications interfaces 208, for outputting answers at step/operation 412. For example, the QA computing entity 65 may transmit the answers via the networks 135 to the one or more user computing entities 30 as shown in FIG. 1. In various embodiments of the present invention, the output answer is the top ranked answer at step/operation 410.

As described above, in some embodiments of the present invention, the retrieval QA application 212 does not require training (in contrast to the deep QA application 213 described below). Further, the retrieval QA application 212 may generate an answer to a question with little or no latency. However, the retrieval QA application 212 has several technical disadvantages. As described above, the retrieval QA application 212 is pipeline-based, where errors can propagate. For example, if the retrieval QA application 212 conducted question analysis incorrectly, the resultant answers can be irrelevant to the question. Further, the quality of the answer depends on proper query formulation and search engine retrieval, and retrieval QA application 212 does not work well for complicated questions.

c. Deep Question-Answering (QA) Applications

In various embodiments of the present invention, the hybrid QA application 210 may comprise one or more deep QA applications 213. For example, as shown in FIG. 2B, the memory element 206 of a QA computing entity 65 of the hybrid QA platform/system 100 may comprise a deep QA application 213 (e.g., deep QA model 213). The deep QA application 213 generates an answer responsive to a question based on one or more machine learning models (e.g. deep learning models). Example operations of a deep QA application 213 are shown in FIG. 5.

Figure 5:
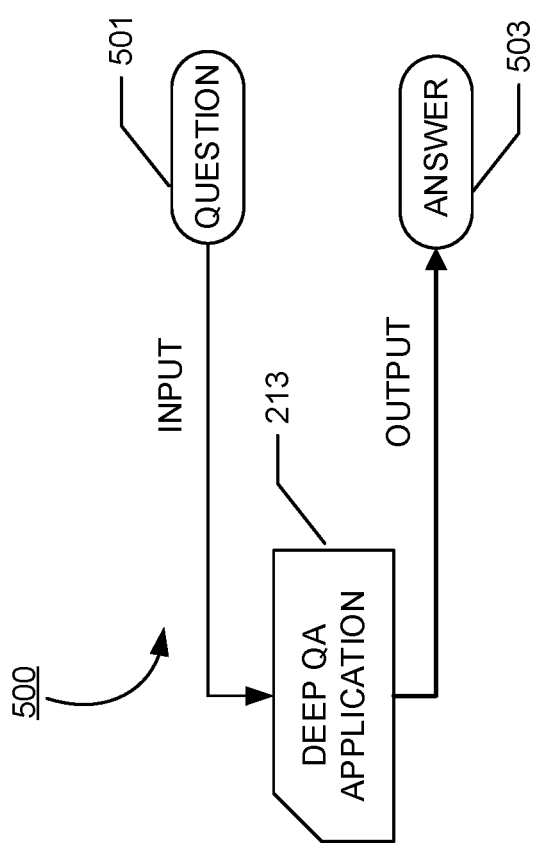
FIG. 5 is a flowchart illustrating an example method of a deep question-answering (QA) application generating an answer responsive to an input question, in accordance with various embodiments of the present invention.

Referring now to FIG. 5, an example method 500 illustrates operation of a deep QA application 213 in accordance with embodiments of the present invention. At step/operation 501, the QA computing entity 65 includes means, such as the communications interface 208, for receiving a question as an input to the deep QA application 213 (e.g., deep QA model 213). For example, a user may input a question through one of the user computing entities 30 as shown in FIG. 1, and the QA computing entity 65 may receive the question via the networks 135.

In various embodiments, the question may be posed in natural language form. As an example, the following question may be the input to the deep QA application:

How can the plan member get pre-approval when the doctor won't do it?

After receiving the input question, the QA computing entity 65 includes means, such as one or more processing elements 205 and the memory element 206, for generating an answer using the deep QA application 213 (e.g., deep QA model 213). As described above, the deep QA application 213 may be based on deep learning models or neural networks. Deep learning models or neural networks enable computing entities to automatically detect and/or classify features from raw data. An example deep learning model or neural network is shown in FIG. 6.

Figure 6:
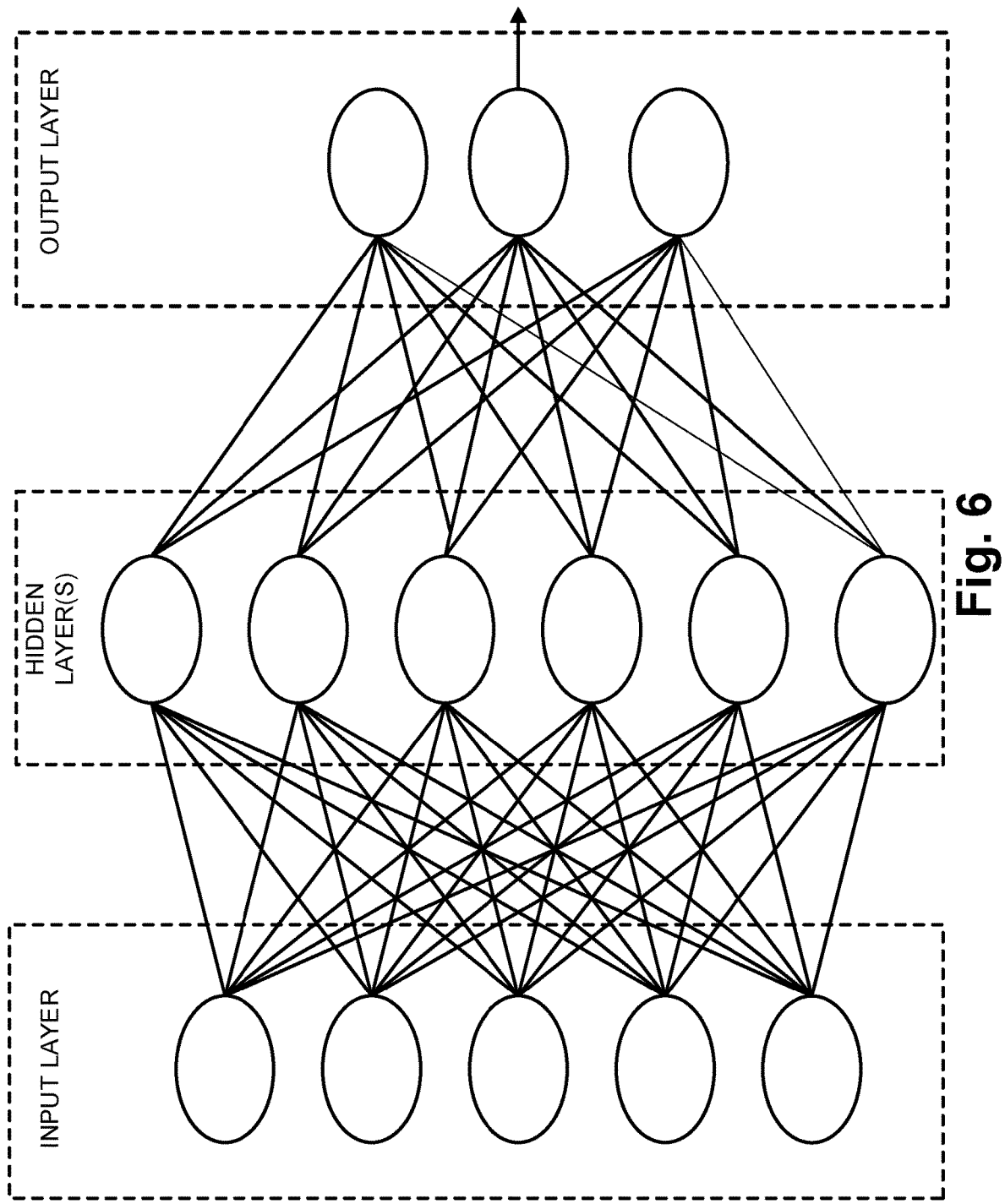
FIG. 6 is an example artificial neural network in accordance with various embodiments of the present invention.

Referring now to FIG. 6, an example artificial neural network of the deep QA application 213 is shown. The example artificial neural network includes an interconnected group of nodes. Each node represents a mathematical function. The input to the mathematical function may include a set of input values and associated weights, and the mathematical function may map the inputs and weights to an output. The arrows connecting the nodes represent connections from the output of one node to the input of another node. For purposes of illustration, FIG. 6 shows a total of fourteen nodes. It is noted, however, that FIG. 6 is not meant to limit the number of nodes in an artificial neural network.

In FIG. 6, nodes are aggregated into layers. In this regard, different layers may perform different transformations of their corresponding inputs. As shown in FIG. 6, the example artificial neural network includes at least three layers: an input layer, one or more hidden layer(s), and an output layer. For purposes of illustration, FIG. 6 shows one hidden layer. It is noted, however, that FIG. 6 is not meant to limit the number of hidden layers in an artificial neural network.

In an example, each of the nodes in the input layer is generated based on tokenization of the input question. Continuing from the above example, tokens of the input question include:

How; can; the; plan; member; get; pre-approval; when; the; doctor; won't; do; it;?

In the above example, each token is separated by a semicolon.

The artificial neural network may then "embed" or map each token into a vector with real numbers. For example, the artificial neural network may map the word "plan" as follow:

W("plan")=(0.4, 0.8, −0.6, . . . )

In some embodiments, the mapping is conducted based on one or more lookup tables (for example, a matrix) that identify the numbers for each word.

Through embedding and conducting calculations in the one or more hidden layers, the artificial neural network determines the meaning and context of the question. The artificial neural network then calculates the probabilities (e.g. confidence scores) of which answer is likely to be the correct answer to the question. The artificial neural network further selects answer that has the highest probability (e.g. confidence score).

In the above mentioned example, the simple baseline model of deep learning is used. It is noted, however, that other types of deep learning models may be used in accordance with various embodiments of the present invention.

Referring back to FIG. 5, after an answer is generated, the QA computing entity 65 includes means, such as one or more processing elements 205 and the communications interfaces 208, for outputting an answer at step/operation 503. For example, the QA computing entity 65 may transmit the answer via the networks 135 to the one or more user computing entities 30 as shown in FIG. 1.

As indicated, "training" the deep QA application 213 (e.g., deep QA model 213) refers to the process that adjusts the mathematical functions of the deep QA application 213 (e.g., deep QA model 213) based on an example input and its desired output. As described above, each node in the artificial neural network may represent a mathematical function, and the input to the mathematical function may include a set of input values and associated weights. When training the deep QA application 213 (e.g., deep QA model 213), QA pairs 215 are provided to the deep QA application 213 (e.g., deep QA model 213). The deep QA application 213 (e.g., deep QA model 213) may generate an answer based on the Question in the QA pair, and compare the answer to the Answer in the QA pair (e.g., the desired answer). Based on the comparison, the deep QA application 213 (e.g., deep QA model 213) may then adjust the mathematical functions (for example, the weights) of nodes in hidden layer(s) in the artificial neural network. By doing so, the deep QA application 213 (e.g., deep QA model 213) is able to provide desired answer to a question similar to the Question in the QA pair.

As illustrated above, deep QA application 213 provides an approach to question-answering by having an end-to-end model where the question is the input and the answer and corresponding score generated based on machine learning is the output. One technical advantage of the deep QA application 213 is that its machine learning model that can always be improved by adding more labeled data for training. In other words, the deep QA application 213 learns to improve its accuracy by examining example input question-answer (QA) pairs, and building a model that returns answers for similar questions in the example input QA pairs by adjusting the weights of different nodes in the network (details are further described below in connection with FIG. 7). Through training, the deep QA application 213 can generate accurate answers to complex questions.

One technical disadvantage of the deep QA application 213 is that it requires data for training. When the input question is not similar to any question in the training data, the deep QA application 213 may behave poorly and fail generate an accurate answer to the question. As described in further detail below, various embodiments of the present invention overcome these technical disadvantages by creating a hybrid QA application that includes both a retrieval QA application and a deep QA application, as well as a question classification model (QCM) that determines whether an input question is better suited for the retrieval QA application or the deep QA application.

d. Hybrid Question-Answering (QA) Applications

As described above, both the retrieval QA application and the deep QA application have their own disadvantages, and technical challenges exist in generating accurate answers to complex questions.

Figure 8:
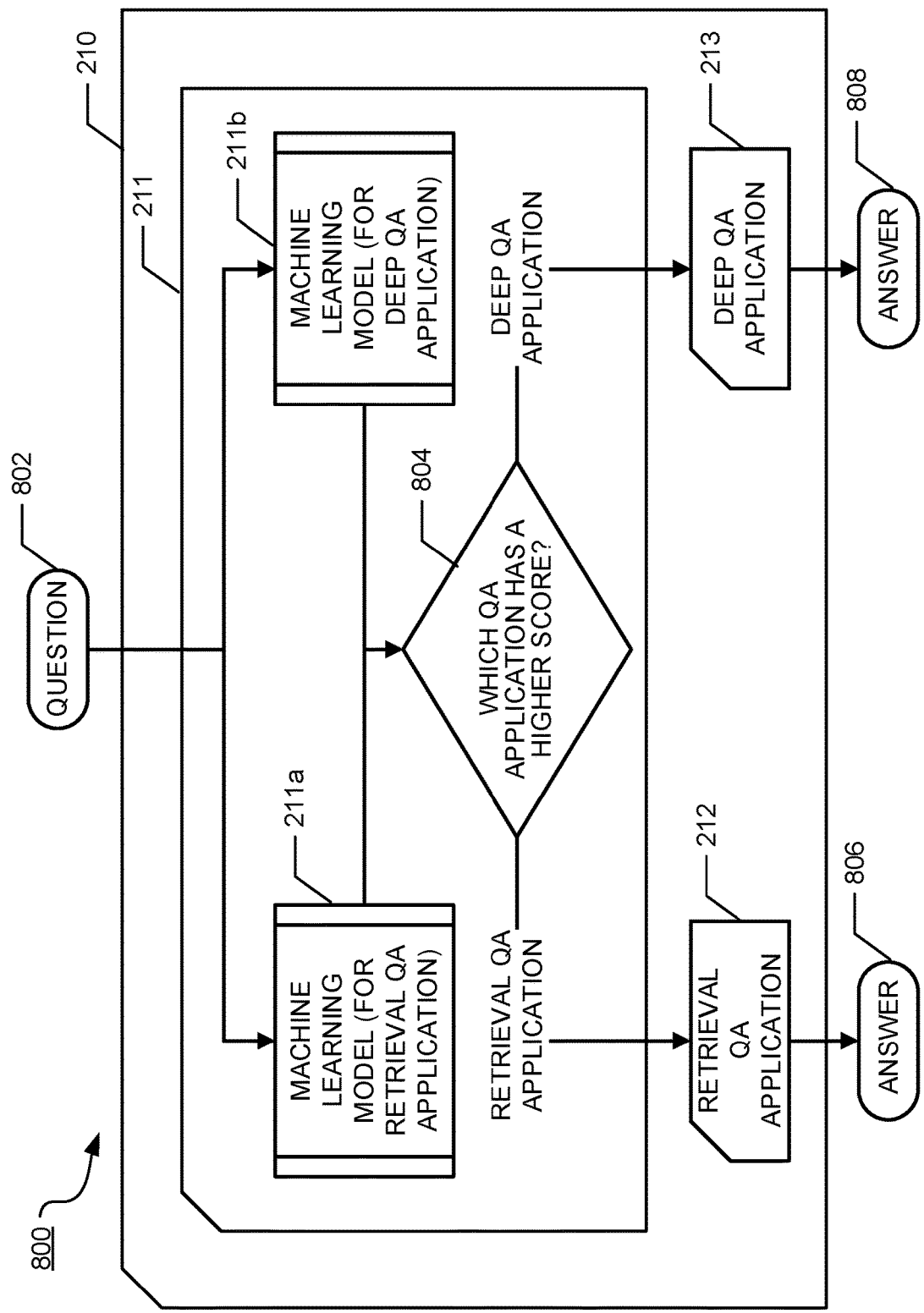
Figure 9:
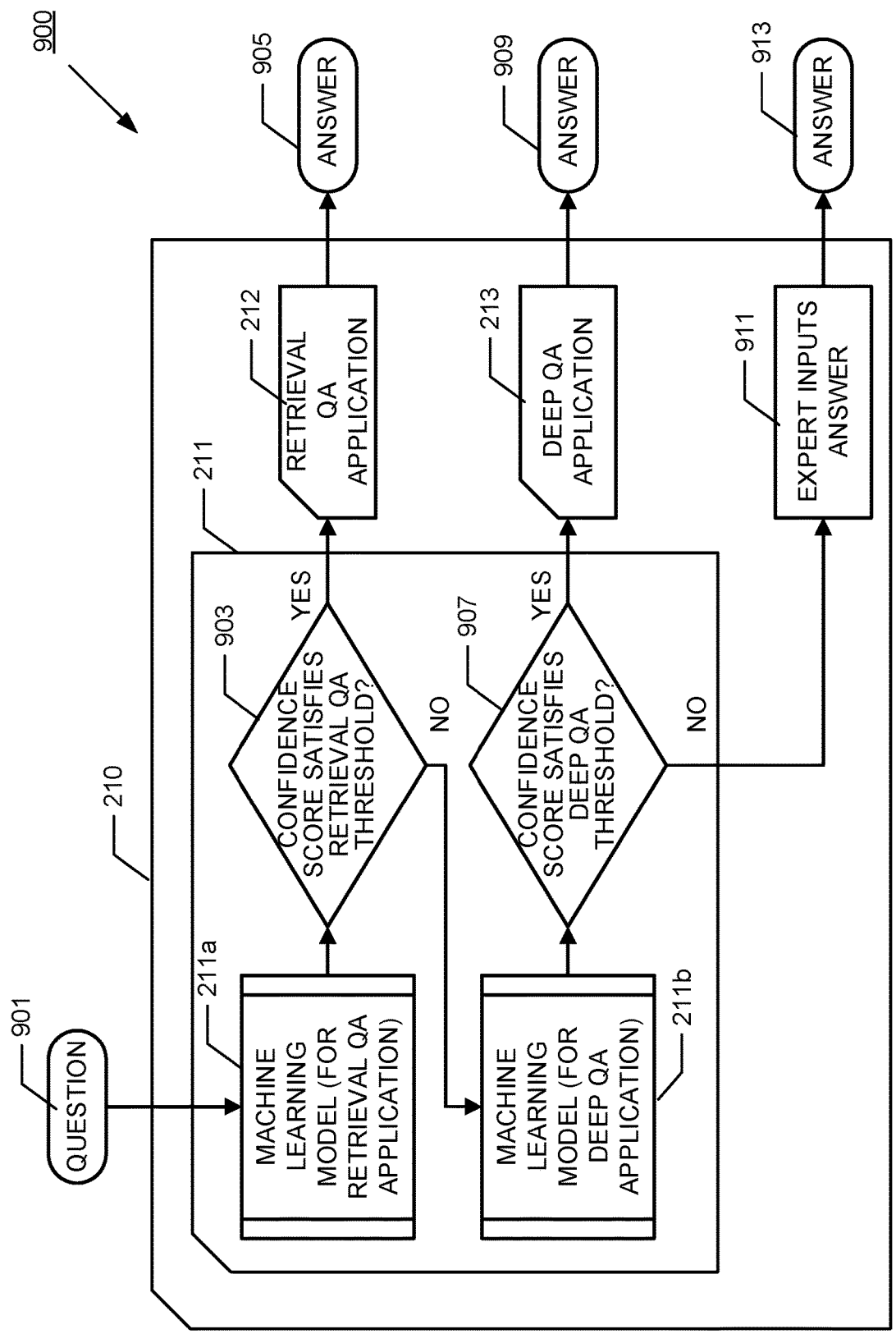

Various embodiments of the present invention solve these technical challenges by developing a hybrid QA application 210 that comprises one or more retrieval QA applications and one or more deep QA applications, as well as a question classification model (QCM) 211 that determines whether the retrieval QA application(s) or the deep QA application(s) can generate a better answer to an input question. Example operations of the hybrid QA application 210 with a QCM 211 in accordance with various embodiments are shown in FIGS. 7-9.

Figure 7:
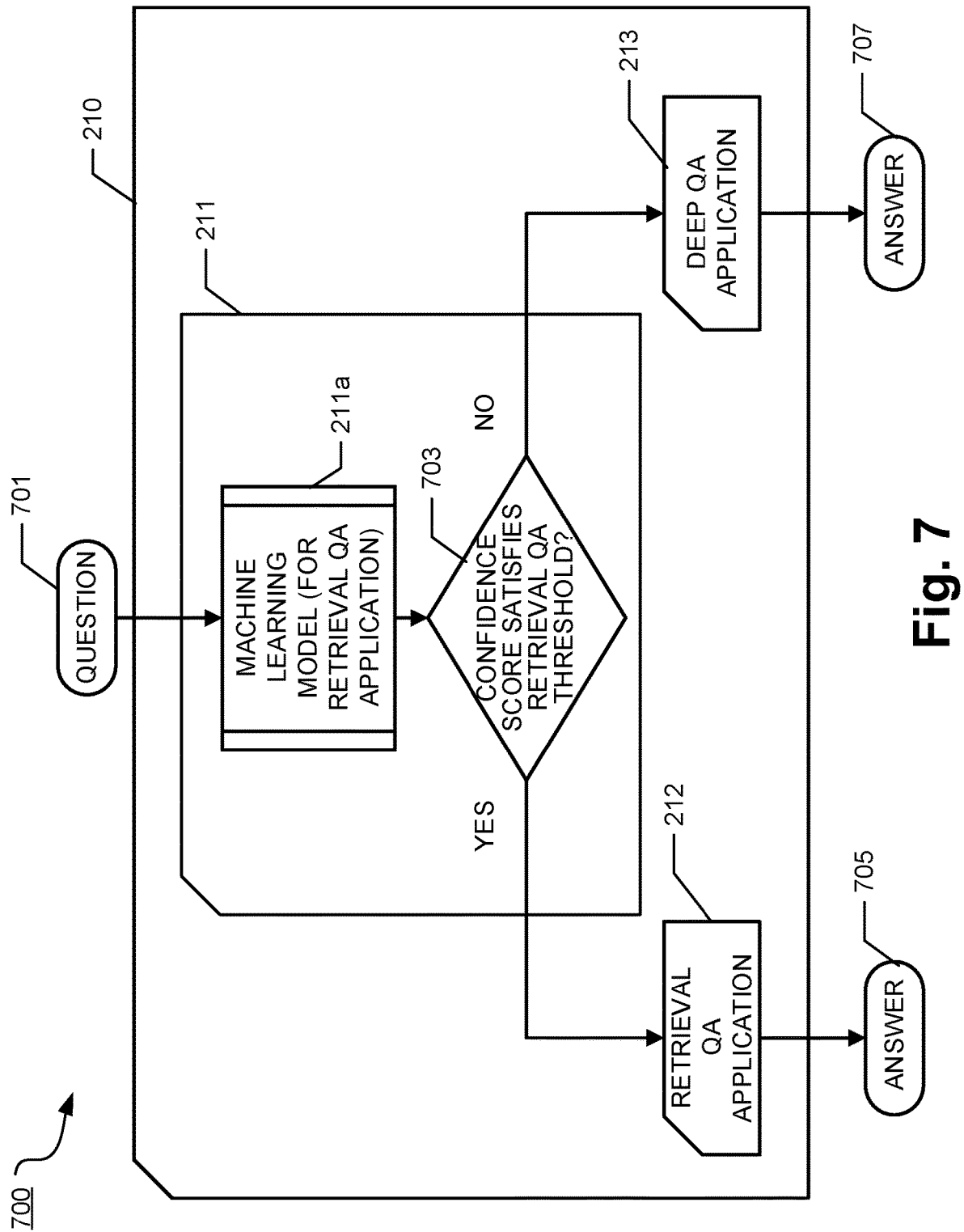
FIGS. 7, 8, 9, 10, 11, and 12 are flowcharts for example operations, steps, and processes in accordance with various embodiments of the present invention.

Referring now to FIG. 7, an example method 700 illustrates operation of a hybrid QA application 210 with a question classification model (QCM) 211 in accordance with embodiments of the present invention.

At step/operation 701, the QA computing entity 65 includes means, such as the communications interface 208, for receiving a question as an input to the QCM 211 of the hybrid QA application 210. For example, a user may input a question through one of the user computing entities 30 as shown in FIG. 1, and the QA computing entity 65 may receive the question via the networks 135. In various embodiments, the question may be posed in natural language form.

As described above, the QCM 211 may include a machine learning model 211a for the retrieval QA application 212. The machine learning model may be of a variety of types, including a binary classification model. The machine learning model 211a for the retrieval QA application 212 may calculate a confidence score for the retrieval QA application 212 based on the input question. The confidence score indicates the likelihood that an answer generated by the retrieval QA application 212 is the correct answer to the input question.

At step/operation 703, the QA computing entity 65 (e.g., via the QCM 211) determines whether the confidence score associated with the retrieval QA application 212 satisfies a configurable threshold. From a technical standpoint, the configurable threshold for the confidence score provides quality control on the output answer. In other words, only answers generated by the retrieval QA application 212 that have a sufficient accuracy can be output to one or more of the user computing entities 30. The threshold may be determined based on system needs.

If, at step/operation 703, the QA computing entity 65 (e.g., via the QCM 211) determines that the confidence score associated with the retrieval QA application 212 satisfies the configurable threshold, the hybrid QA application 210 may comprise computer program instructions that, when executed by one or more processing elements 205, cause the QA computing entity 65 to format and to generate an answer by the retrieval QA application 212. Subsequently, the QA computing entity 65 may output the answer generated by the retrieval QA application 212 at step/operation 705.

If, at step/operation 703, the QA computing entity 65 (e.g., via the QCM 211) determines that the confidence score associated with the retrieval QA application 212 does not satisfy the configurable threshold, the hybrid QA application 210 may comprise computer program instructions that, when executed by one or more processing elements 205, cause the QA computing entity 65 to format and to generate an answer by the deep QA application 213 (e.g., deep QA model 213). Subsequently, the QA computing entity 65 may output the answer generated by the deep QA application 213 (e.g., deep QA model 213) at step/operation 707.

Referring now to FIG. 8, an example method 800 illustrates operation of a hybrid QA application 210 with a question classification model (QCM) 211 in accordance with embodiments of the present invention. In this example, a confidence score for the question is determined for both the retrieval QA application 212 and the deep QA application 213.

At step/operation 802, the QA computing entity 65 includes means, such as the communications interface 208, for receiving a question as an input to the QCM 211 of the hybrid QA application 210. For example, a user may input a question through one of the user computing entities 30 as shown in FIG. 1, and the QA computing entity 65 may receive the question via the networks 135. The question may be posed in natural language form.

As shown in FIG. 8, the QA computing entity 65 (e.g., via the QCM 211 of the hybrid QA application 210) includes means, such as one or more processing elements 205 and the memory element 206, for calculating a confidence score for generating an answer to the input question using a retrieval QA application. For example, the QCM 211 of the hybrid QA application 210 may comprise computer program instructions that, when executed by one or more processing elements 205, cause the QA computing entity 65 to calculate a confidence score for the retrieval QA application 212 based on the input question using the machine learning model 211a for the retrieval QA application 212. The confidence score indicates the likelihood that the retrieval QA application 212 can successfully generate an accurate answer to the input question. In other words, the confidence score indicates the likelihood that an answer generated by the retrieval QA application 212 is the correct answer to the input question.

As shown in FIG. 8, the QA computing entity 65 (e.g., the QCM 211 of the hybrid QA application 210) also includes means, such as one or more processing elements 205 and the memory element 206, for calculating a confidence score for generating an answer to the input question using a deep QA application. For example, the QCM 211 of the hybrid QA application 210 may comprise computer program instructions that, when executed by one or more processing elements 205, cause the QA computing entity 65 to calculate a confidence score for the deep QA application 213 based on the input question using the machine learning model 211b. The confidence score indicates the likelihood that the deep QA application 213 (e.g., deep QA model 213) can successfully generate an accurate answer to the input question. In other words, the confidence score indicates the likelihood that an answer generated by the deep QA application 213 (e.g., deep QA model 213) is the correct answer to the input question.

In one embodiment, machine learning model 211a and machine learning model 211b may be the same machine learning model. In another embodiment, machine learning model 211a and machine learning model 211b may be different models. In an implementation in which 211a and 211b are different models, the QA computing entity 65 may perform additional processing, such as score normalization, so the confidence scores from two separate models can be compared. As will be recognized, a variety of other approaches and techniques can be used to adapt to various needs and circumstances.

At step/operation 804, the QA computing entity 65 (e.g., the QCM 211 of the hybrid QA application 210) includes means, such as one or more processing elements 205 and the memory element 206, for determining which one of the two confidence scores is higher than the other. For example, the QCM 211 of the hybrid QA application 210 may comprise computer program instructions that, when executed by one or more processing elements 205, cause the QA computing entity 65 to compare the confidence score associated with the retrieval QA application 212 (generated by the machine learning model for retrieval QA application 211a of the QCM 211) and the confidence score associated with the deep QA application 213 (generated by the machine learning model for deep QA application 211b of the QCM 211). Based on the comparison result, the QA computing entity 65 may generate an answer to the question using either the retrieval QA application 212 at step/operation 806 or the deep QA application 213 (e.g., deep QA model 213) at step/operation 808.

For example, if at step/operation 804, the QA computing entity 65 (e.g., the QCM 211 of the hybrid QA application 210) determines that the confidence score associated with the retrieval QA application 212 is higher than the confidence score associated with the deep QA application 213 (e.g., deep QA model 213), the QCM 211 of the hybrid QA application 210 may comprise computer program instructions that, when executed by one or more processing elements 205, cause the QA computing entity 65 to format the question for the retrieval QA application 212 and to generate an answer by the retrieval QA application 212. The retrieval QA application 212 may generate an answer to the question at step/operation 806 based on various embodiments of the present disclosure, including, for example, as described in connection with FIG. 4.

If, at step/operation 804, the QA computing entity 65 (e.g., the QCM 211 of the hybrid QA application 210) determines that the confidence score associated with the deep QA application 213 (e.g., deep QA model 213) is higher than the confidence score associated with the retrieval QA application 212, the QCM 211 of the hybrid QA application 210 may comprise computer program instructions that, when executed by one or more processing elements 205, cause the QA computing entity 65 to format the question for the deep QA application 213 and to generate an answer by the deep QA application 213 (e.g., deep QA model 213). The deep QA application 213 (e.g., deep QA model 213) may generate an answer to the question at step/operation 808 based on various embodiments of the present disclosure, including, for example, as described in connection with FIGS. 5-6. The output of the deep QA model 213 comprises a QA pair and a confidence score for the QA pair.

After the answer is generated by either the retrieval QA application 212 or the deep QA application 213 (e.g., deep QA model 213), the QA computing entity 65 includes means, such as one or more processing elements 205 and the communications interfaces 208, for outputting the answer. For example, the QA computing entity 65 may transmit the answer via the networks 135 to the one or more user computing entities 30 as shown in FIG. 1.

Referring now to FIG. 9, an example method 900 illustrates operations of the hybrid QA application 210 in the hybrid QA platform/system 100 in accordance with various embodiments of the present invention.

At step/operation 901, the QA computing entity 65 includes means, such as the communications interface 208, for receiving a question as an input to the QCM 211 of the hybrid QA application 210. For example, a user may input a question through one of the user computing entities 30 as shown in FIG. 1, and the QA computing entity 65 may receive the question via the networks 135. In various embodiments, the question may be posed in natural language form.

Responsive to receiving the question, the QA computing entity 65 (e.g., the QCM 211 of the hybrid QA application 210) includes means, such as one or more processing elements 205 and the memory element 206, for calculating a confidence score for generating an answer to the input question by a retrieval QA application. For example, the QCM 211 of the hybrid QA application 210 may comprise computer program instructions that, when executed by one or more processing elements 205, cause the QA computing entity 65 (e.g., the QCM 211 of the hybrid QA application 210) to calculate a confidence score for the retrieval QA application 212 based on the input question using machine learning model for retrieval QA application 212. The confidence score indicates the likelihood that an answer generated by the retrieval QA application 212 is the correct answer to the input question. Further, at step/operation 903, the QA computing entity 65 determines whether the confidence score associated with the retrieval QA application 212 satisfies a configurable threshold.

If, at step/operation 903, the QA computing entity 65 determines that the confidence score associated with the retrieval QA application 212 (generated by a machine learning model 211a for the retrieval QA application 212) satisfies the configurable threshold, the hybrid QA application 210 may comprise computer program instructions that, when executed by one or more processing elements 205, cause the QA computing entity 65 to generate an answer by the retrieval QA application 212. Subsequently, the QA computing entity 65 may output the answer generated by the retrieval QA application 212 at step/operation 905.

If, at step/operation 903, the QA computing entity 65 (e.g., the QCM 211 of the hybrid QA application 210) determines that the confidence score associated with the retrieval QA application 212 does not satisfy the configurable threshold, the QCM 211 of the hybrid QA application 210 may comprise computer program instructions that, when executed by one or more processing elements 205, cause the QA computing entity 65 to calculate a confidence score for generating an answer to the input question by a deep QA application 213. For example, the QCM 211 of the hybrid QA application 210 may comprise computer program instructions that, when executed by one or more processing elements 205, cause the QA computing entity 65 (e.g., the QCM 211 of the hybrid QA application 210) to calculate a confidence score for the deep QA application 213 (e.g., deep QA model 213) based on the input question using a machine learning model 211b for the deep QA application 213. Further, at step/operation 907, the QA computing entity 65 determines whether the confidence score associated with the deep QA application 213 satisfies a configurable threshold.

If, at step/operation 907, the QA computing entity 65 determines that the confidence score associated with the deep QA application 213 (generated by a machine learning model 211b for the deep QA application 213) satisfies the configurable threshold, the hybrid QA application 210 may comprise computer program instructions that, when executed by one or more processing elements 205, cause the QA computing entity 65 to generate an answer by the deep QA application 213 (e.g., deep QA model 213). Subsequently, the QA computing entity 65 may output the answer generated by the deep QA application 213 (e.g., deep QA model 213) at step/operation 909.

If, at step/operation 907, the QA computing entity 65 determines that the confidence score associated with the deep QA application 213 (generated by a machine learning model 211b for the deep QA application 213) does not satisfy the configurable threshold, the hybrid QA application 210 may comprise computer program instructions that, when executed by one or more processing elements 205, cause the QA computing entity 65 to request a human (for example, an expert) to input the answer to the question at step/operation 911. For example, the QA computing entity 65 may transmit the question to one of the user computing entities 30 via the networks 135, and an expert may input an answer to the question through one of the user computing entities 30 and the networks 135. In an alternative example, the expert may input the answer to the question via the QA computing entity 65. Subsequently, the QA computing entity 65 may transmit the answer via the networks 135 to the one or more user computing entities 30 as shown in FIG. 1 at step/operation 913.

As presented in FIGS. 7-9, present invention provides several technical advantages. For example, by utilizing the question classification model, the hybrid QA platform/system 100 is capable of identifying the best QA application for a given input question. By doing so, the hybrid QA platform/system 100 combines the technical advantages of retrieval QA application and deep QA application.

Further, the hybrid QA application in accordance with various embodiments of the present invention frees up human agents (e.g. customer representatives) at call centers, allowing representatives to take their time and provide better customer service. Business chat-bot applications can also reduce average call times and provide cost savings. In other words, various embodiments of the present invention improve customer engagement with minimized costs, and provide cross-industry impact with technical advantages over existing question-answering systems.

e. Question Classification Model (QCM)

As described above, in various embodiments of the present invention, the QCM 211 includes one or more models. For example, it may include one or more binary classification models that decide whether the retrieval QA application or the deep QA application provides a better answer to a given input question. The binary classification models can be machine learning models based on, for example, Logistic Regression, Random Forest, or XGBoost. In some embodiments, the QCM 211 may be based on an ensemble model, such as Bagging, Boosting, or Stacking. In some embodiments, the QCM 211 may be based on a deep learning model, such as an artificial neural network, or a long short-term memory (LSTM) architecture. In some embodiments, the hybrid QA platform/system 100 may select a particular model for the QCM 211 based on system based on evaluations of system needs. This selection may be in real time based on the question.

One of the many technical advantages of the present invention is that the QCM 211 can adapt over time and provide accurate predictions on whether an input question is better suited for a retrieval QA application 212 or a deep QA application 213. To achieve these technical advantages, various embodiments of the present invention may adjust or "train" the QCM 211. Example operations of training the QCM 211 are shown in FIGS. 10, 11, and 12.

Referring now to FIG. 10, an example method 1000 illustrates operations of initializing the training of the question classification model (QCM) 211 is shown.

At step/operation 1002, the QA computing entity 65 includes means, such as one or more processing elements 205 and the memory element 206, for extracting question-answer pairs. For example, the hybrid QA application 210 may comprise computer program instructions that, when executed by one or more processing elements 205, cause the QA computing entity 65 to create question-answer pairs from data sources in the hybrid QA platform/system 100. For example, when the hybrid QA platform/system 100 is implemented in a healthcare organization or other organizations, the data sources may include chat logs between consumers and consumer service representatives of the organization. In this example, the QA computing entity 65 may create a QA pair based on the questions asked by a consumer and the answers provided by a consumer service representative. Other data sources may include, for example, documentations, profile information, and/or the like.

Further, the QA computing entity 65 may add the question-answer pairs (extracted at step/operation 1002) to the training data 216 stored in the storage media 207 as shown in FIG. 2C (and will be described further in connection with FIGS. 11-12). In other words, the training data 216 includes question-answer pairs.

At step/operation 1004, the QA computing entity 65 includes means, such as one or more processing elements 205 and the memory element 206, for creating an empty dataset. For example, the hybrid QA application 210 may comprise computer program instructions that, when executed by one or more processing elements 205, cause the QA computing entity 65 to initialize the creation of an empty dataset. In some embodiments, the empty dataset may be an empty labeled dataset. Details of adding data to the empty dataset is described further below in connection with FIGS. 11 and 12.

At step/operation 1006, the QA computing entity 65 includes means, such as one or more processing elements 205 and the memory element 206, for optionally building a retrieval QA application. For example, the hybrid QA application 210 may comprise computer program instructions that, when executed by one or more processing elements 205, cause the QA computing entity 65 to create a retrieval QA application 212 in accordance with various embodiments of the present invention, including, for example, those described in connection with FIG. 4. The retrieval QA application 212 is used by the QA computing entity 65 to train the QCM 211, details of which are described further in connection with FIGS. 11 and 12.

Referring now to FIG. 11, an example method 1100 illustrates operation of a hybrid QA platform/system 100 with a QCM 211 in accordance with embodiments of the present invention. In particular, FIG. 11 illustrates example operations of adjusting (or "training") the QCM 211.

As described above, the training data 216 may include question-answer pairs. For example, the following is a question-answer pair that may be included in the training data 216:

Q: What is the pharmacy deductible?

A: A pharmacy deductible is a fixed amount that you need to pay for prescribed medications before the health plan starts to make payments for covered prescriptions.

As shown in FIG. 11, the QA computing entity 65 includes means, such as one or more processing elements 205 and the memory element 206, for generating a candidate answer at step/operation 1107 responsive to the question in a QA pair from the training data 216. For example, the hybrid QA application 210 may comprise computer program instructions that, when executed by one or more processing elements 205, cause the QA computing entity 65 to identify the question from the QA pair at step/operation 1103, and generate a candidate answer using a retrieval QA application 212. In some embodiments, the retrieval QA application 212 is built at step/operation 1006 of FIG. 10. In some embodiments, the retrieval QA application is the retrieval QA application 212 of the hybrid QA application 210.

At step/operation 1109, the QA computing entity 65 includes means, such as one or more processing elements 205 and the memory element 206, for computing the similarities between the candidate answer and the answer from the QA pair. For example, the hybrid QA application 210 may comprise computer program instructions that, when executed by one or more processing elements 205, cause the QA computing entity 65 to compare the candidate answer generated by the retrieval QA application 212 at step/operation 1107 with the answer from the QA pair at step/operation 1105.

In various embodiments of the present invention, the QA computing entity 65 may use various algorithms for evaluating the quality of the candidate answer as compared to the correct answer in the QA pair. For example, the QA computing entity 65 may use bilingual evaluation understand (BLEU) algorithms. As another example, the QA computing entity 65 may evaluate candidate answer based on Metric for Evaluation of Translation with Explicit Ordering (METEOR) or Recall-Oriented Understudy for Gi sting Evaluation (ROUGE).

At step/operation 1111, the QA computing entity 65 includes means, such as one or more processing elements 205 and the memory element 206, for determining whether the similarities between the candidate answer and the answer from the QA pair satisfy a configurable threshold. The threshold can be established according to system needs.

If, at step/operation 1111, the QA computing entity 65 determines that the similarities between the candidate answer and the answer from the QA pair satisfy a configurable threshold, then the QA computing entity 65 determines that the question from the training data 216 at step/operation 1103 can be answered satisfactorily by a retrieval QA application, as shown in step/operation 1115. For example, the QA computing entity 65 may determine that the following questions can be answered satisfactorily by a retrieval QA application:

What is the pharmacy deductible?
How can I check my HSA balance?

If, at step/operation 1111, the QA computing entity 65 determines that the similarities between the candidate answer and the answer from the QA pair do not satisfy a configurable threshold, then the QA computing entity 65 determines that the question is a good candidate for the deep QA application, as shown in step/operation 1113. For example, the QA computing entity 65 may determine that the following questions can be answered satisfactorily by a deep QA application:

When submitting medical claims, can I include multiple bills, from different doctors with the one claim form?
How can the plan member get pre-approval when the doctor won't do it?

As shown in FIG. 11, the determination as to whether the question can be answered by a retrieval QA application 212 or deep QA application 213 (e.g., step/operation 1113 or step/operation 1115) are used by the QA computing entity 65 to train the question classification module (QCM) 211. The QA computing entity 65 may add the question (e.g., step/operation 1103) and the determination of whether to use a retrieval QA application 212 or a deep QA application 213 for this question (e.g., step/operation 1113 or step/operation 1115) to the empty labeled dataset created by the QA computing entity 65 at step/operation 1004 of FIG. 10. The labeled dataset may then be used to train the QCM 211.

In some embodiments, the QA computing entity 65 may train the QCM machine learning model 211a for the retrieval QA application 212 and/or the machine learning model 211b for deep QA application 213 using the labeled dataset. For example, the QA computing entity 65 may provide questions from the labeled dataset to the QCM 211, and the QCM 211 may calculate confidence scores for the deep QA application 213 using the machine learning model (for deep QA application) 211b. The QCM 211 then determines whether the labeled data set indicates these questions are suitable for the deep QA application 213, and adjusts the mathematical functions of the machine learning model (for deep QA application) 211b so that the confidence scores are in accordance with the indications from the labeled data set. Additionally or alternatively, the QCM 211 may calculate the confidence scores for the retrieval QA application 212 using the machine learning model 211a for the retrieval QA application 212. The QCM 211 then determines whether the labeled data set indicates these questions are suitable for the retrieval QA application 212, and adjusts the mathematical functions of the machine learning model 211a for the retrieval QA application 212 so that the confidence scores are in accordance with the indications from the labeled data set.

In some embodiments, the QA computing entity 65 may provide questions from the labeled dataset to the QCM 211, and the QCM 211 generates a determination as to whether to use a retrieval QA application or a deep QA application for the question. The QCM 211 then compares the determination with the determination stored in the labeled dataset for this question (e.g., the correct determination), and adjusts the mathematical functions (for example, the weights) in nodes of hidden layer(s) in the artificial neural network based on the comparison. By doing so, the QCM 211 is able to arrive at the desired determinations to questions similar to these stored in the labeled dataset.

In various embodiments of the present invention, the operations as illustrated in FIG. 11 is repeated for all question-answer pairs stored in the training data 216, thereby training the QCM 211 to provide accurate determinations to questions similar to the questions in the training data 216.

Referring now to FIG. 12, an example method 1200 illustrates operation of a hybrid QA platform/system 100 with a question classification model 211 in accordance with embodiments of the present invention. In particular, FIG. 11 illustrates example operations of adjusting (or "training") the QCM 211

As described above, the training data 216 may include question-answer pairs. Further, as shown in FIG. 12, the QA computing entity 65 includes means, such as one or more processing elements 205 and the memory element 206, for generating a candidate answer at step/operation 1210 responsive to the question of a QA pair from the training data 216. For example, the hybrid QA application 210 may comprise computer program instructions that, when executed by one or more processing elements 205, cause the QA computing entity 65 to identify the question from the QA pair at step/operation 1204, and generate a candidate answer using the retrieval QA application 212 at step/operation 1210.

At step/operation 1212, the QA computing entity 65 includes means, such as one or more processing elements 205 and the memory element 206, for requesting an expert input associated with the candidate answer generated by the retrieval QA application 212 at step/operation 1210 and the answer from the QA pair in the training data 216 at step/operation 1206. For example, as shown in step/operation 1214, the expert input may indicate whether these two answers are similar enough. If so, then the QA computing entity 65 determines that the question from the training data 216 at step/operation 1204 can be answered satisfactorily by a retrieval QA application, as shown in step/operation 1218.

If, at step/operation 1214, the expert input indicates that the candidate answer at step/operation 1210 is not similar to the answer from the QA pair at step/operation 1206, the QA computing entity 65 may determine that the question is a good candidate for the deep QA application, as shown in step/operation 1216.

As shown in FIG. 12, the determination as to whether the question can be answered by a retrieval QA application 212 or deep QA application 213 (e.g., step/operation 1218 or step/operation 1216) are used by the QA computing entity 65 to train the question classification module (QCM) 211. For example, the QA computing entity 65 may add the question (e.g., step/operation 1204) and the determination of whether to use a retrieval QA application 212 or a deep QA application 213 for this question (e.g., step/operation 1218 or step/operation 1216) to the empty labeled dataset created by the QA computing entity 65 at step/operation 1004 of FIG. 10. The dataset may then be used to train the QCM 211, similar to those described above in connection with FIG. 11.

VI. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for implementing a question classification model for a hybrid question answering (QA) application, the hybrid QA application comprising a deep QA application and a retrieval QA application, the computer-implemented method comprises:
   receiving, by one or more processors, an input question originating from a user computing entity;
   determining, by the one or more processors, a first confidence score associated with the retrieval QA application using the question classification model, the first confidence score indicating a success likelihood of the retrieval QA application answering the input question and the question classification model comprising one or more machine learning models;
   determining, by the one or more processors, whether to use the retrieval QA application or the deep QA application to generate an answer to the input question by determining whether the first confidence score satisfies a first configurable threshold;
   responsive to determining that the first confidence score satisfies the first configurable threshold, generating, by the one or more processors, the answer to the input question using the retrieval QA application; and
   responsive to determining that the first confidence score does not satisfy the first configurable threshold, generating, by the one or more processors, the answer to the input question using the deep QA application.

2. The computer-implemented method of claim 1, further comprising:
   responsive to determining that the first confidence score does not satisfy the first configurable threshold, determining, by the one or more processors, a second confidence score associated with the deep QA application using the question classification model, the second confidence score indicating a success likelihood of the deep QA application answering the input question;
   determining, by the one or more processors, whether the second confidence score satisfies a second configurable threshold; and
   responsive to determining that the second confidence score satisfies the second configurable threshold, generating, by the one or more processors, the answer to the input question using the deep QA application.

3. The computer-implemented method of claim 1, further comprising:
   determining, by the one or more processors, a second confidence score associated with the deep QA application using the question classification model, the second confidence score indicating a success likelihood of the deep QA application answering the input question; and
   determining, by the one or more processors, whether the first confidence score is higher than the second confidence score.

4. The computer-implemented method of claim 3, wherein determining whether to use the deep QA application or the retrieval QA application to generate the answer further comprises:
   responsive to determining, by the one or more processors, that the first confidence score is higher than the second confidence score, generating, by the one or more processors, the answer to the input question using the retrieval QA application.

5. The computer-implemented method of claim 3, wherein determining whether to use the deep QA application or the retrieval QA application to generate the answer further comprises:
   responsive to determining, by the one or more processors, that the second confidence score is higher than the first confidence score, generating, by the one or more processors, the answer to the input question using the deep QA application.

6. The computer-implemented method of claim 3, wherein determining the first confidence score and the second confidence score are generated by the one or more processors using the one or more machine learning models.

7. A computer program product for implementing a question classification model for a hybrid question answering (QA) application, the hybrid QA application comprising a deep QA application and a retrieval QA application, the computer program product comprising a non-transitory computer readable medium having computer program instructions stored therein, the computer program instructions when executed by a processor, cause the processor to:
   receive an input question originating from a user computing entity;
   determine a first confidence score associated with the retrieval QA application using the question classification model, the first confidence score indicating a success likelihood of the retrieval QA application answering the input question and the question classification model comprising one or more machine learning models;
   determine whether to use the retrieval QA application or the deep QA application to generate an answer to the input question by determining whether the first confidence score satisfies a first configurable threshold;
   responsive to determining that the first confidence score satisfies the first configurable threshold, generate the answer to the input question using the retrieval QA application; and
   responsive to determining that the first confidence score does not satisfy the first configurable threshold, generate the answer to the input question using the deep QA application.

8. The computer program product comprising the non-transitory computer readable medium of claim 7, wherein the computer program instructions when executed by the processor, further cause the processor to:
   responsive to determining that the first confidence score does not satisfy the first configurable threshold, determine a second confidence score associated with the deep QA application using the question classification model, the second confidence score indicating a success likelihood of the deep QA application answering the input question;

determine whether the second confidence score satisfies a second configurable threshold; and responsive to determining that the second confidence score satisfies the second configurable threshold, generate the answer to the input question using the deep QA application.

9. The computer program product comprising the non-transitory computer readable medium of claim 7, wherein the computer program instructions when executed by the processor, further cause the processor to:

determine a second confidence score associated with the deep QA application using the question classification model, the second confidence score indicating a success likelihood of the deep QA application answering the input question; and determine whether the first confidence score is higher than the second confidence score.

10. The computer program product comprising the non-transitory computer readable medium of claim 9, wherein determining whether to use the deep QA application or the retrieval QA application to generate the answer further causes the processor to:

responsive to determining that the first confidence score is higher than the second confidence score, generate the answer to the input question using the retrieval QA application.

11. The computer program product comprising the non-transitory computer readable medium of claim 9, wherein determining whether to use the deep QA application or the retrieval QA application to generate the answer further causes the processor to:

responsive to determining that the second confidence score is higher than the first confidence score, generate the answer to the input question using the deep QA application.

12. The computer program product comprising the non-transitory computer readable medium of claim 9, wherein determining the first confidence score and the second confidence score are generated by the one or more processors using the one or more machine learning models.

13. A computing system for implementing a question classification model for a hybrid question answering (QA) application, the hybrid QA application comprising a deep QA application and a retrieval QA application, the computing system comprising a non-transitory computer readable storage medium and one or more processors, the computing system configured to:

receive an input question originating from a user computing entity;

determine a first confidence score associated with the retrieval QA application using the question classification model, the first confidence score indicating a success likelihood of the retrieval QA application answering the input question and the question classification model comprising one or more machine learning models;

determine whether to use the retrieval QA application or the deep QA application to generate an answer to the input question by determining whether the first confidence score satisfies a first configurable threshold;

responsive to determining that the first confidence score satisfies the first configurable threshold, generate the answer to the input question using the retrieval QA application; and responsive to determining that the first confidence score does not satisfy the first configurable threshold, generate the answer to the input question using the deep QA application.

14. The computing system of claim 13, wherein the computing system is further configured to, when determining whether to use the deep QA application or the retrieval QA application to generate the answer:

responsive to determining that the first confidence score does not satisfy the first configurable threshold, determine a second confidence score associated with the deep QA application using the question classification model, the second confidence score indicating a success likelihood of the deep QA application answering the input question;

determine whether the second confidence score satisfies a second configurable threshold; and responsive to determining that the second confidence score satisfies the second configurable threshold, generate the answer to the input question using the deep QA application.

* * * * *